(12) United States Patent
Dickerson et al.

(10) Patent No.: US 10,726,241 B2
(45) Date of Patent: Jul. 28, 2020

(54) SYSTEMS AND METHODS FOR CAPTURING IMAGES USING A PRESSURE SENSITIVE MEMBRANE

(71) Applicant: IDENTIFICATION INTERNATIONAL, INC., Blacksburg, VA (US)

(72) Inventors: Bryan D. Dickerson, Christiansburg, VA (US); Richard K. Fenrich, Blacksburg, VA (US); Christopher R. Robinson, Blacksburg, VA (US); William B. Cowen, Jr., Blacksburg, VA (US)

(73) Assignee: Identification International, Inc., Blacksburg, VA (US)

( * ) Notice: Subject to any disclaimer, the term of this patent is extended or adjusted under 35 U.S.C. 154(b) by 0 days.

(21) Appl. No.: 15/091,532

(22) Filed: Apr. 5, 2016

(65) Prior Publication Data

US 2016/0292491 A1    Oct. 6, 2016

Related U.S. Application Data

(60) Provisional application No. 62/143,779, filed on Apr. 6, 2015.

(51) Int. Cl.
*G06K 9/00* (2006.01)
*G06F 3/044* (2006.01)
*G06F 3/041* (2006.01)

(52) U.S. Cl.
CPC ......... *G06K 9/00046* (2013.01); *G06F 3/041* (2013.01); *G06F 3/044* (2013.01);
(Continued)

(58) Field of Classification Search
CPC ....... G06K 9/00046; G01L 1/16; G06F 3/044; G06F 3/0416; G06F 3/041; G06F 2203/04107; G06F 2203/04109
See application file for complete search history.

(56) References Cited

U.S. PATENT DOCUMENTS 3,982,836 A * 9/1976 Green .................. A61B 5/1172
356/370
4,577,345 A    3/1986 Abramov
(Continued)

FOREIGN PATENT DOCUMENTS

| CN | 102576265 A | 7/2012 |
| CN | 103168283 A | 6/2013 |

(Continued)

OTHER PUBLICATIONS

S.C.B. Mannsfeld et al. Highly Sensitive Flexible Pressure Sensors with Micro-structured 7, 15,23,27 Rubber Dielectric Layers. Nature Materials 9, 859-864 (2010). [Retrieved Jul. 6, 2016] Retrieved from internet<http://www-ssrl.slac.stanford.edu/research/highlights_archive/pressuresensor> p. 859-864.

(Continued)

*Primary Examiner* — Yubin Hung
(74) *Attorney, Agent, or Firm* — Sheppard Mullin Richter & Hampton LLP

(57) ABSTRACT

A total internal reflection based imaging system may include a light transmitting member having an imaging surface. A pressure sensitive membrane may be arranged on the imaging surface. The pressure sensitive membrane may include a top surface, a bottom surface, and an elastic deformable film forming at least a portion of the top surface. The imaging system may include a textured surface disposed between the pressure sensitive membrane and the imaging surface. An application of pressure on the top surface may deform the deformable film to reduce a distance between the deform- (Continued)

able film and the imaging surface. A light source may be configured to emit a light towards the imaging surface such that reduced total internal reflection of the light occurs where the bottom surface of the pressure sensitive membrane contacts the imaging surface. A sensor may be configured to capture the light reflected from the imaging surface.

26 Claims, 20 Drawing Sheets

(52) U.S. Cl.
CPC .. *G06F 3/0416* (2013.01); *G06F 2203/04107* (2013.01); *G06F 2203/04109* (2013.01)

(56) References Cited

U.S. PATENT DOCUMENTS

| | | | |
|---|---|---|---|
| 5,400,662 A | 3/1995 | Tamori | |
| 7,274,396 B2 | 9/2007 | Bock | |
| 7,766,826 B2 | 8/2010 | Lee | |
| 8,265,352 B1* | 9/2012 | Neoh | A61B 5/0059 382/115 |
| 8,736,581 B2 | 5/2014 | Han | |
| 9,848,130 B2 | 12/2017 | Legakis | |
| 2002/0027605 A1* | 3/2002 | Lee | G06K 9/00013 348/294 |
| 2003/0149662 A1* | 8/2003 | Shore | G06Q 20/04 705/39 |
| 2006/0018519 A1* | 1/2006 | Siegel | G06K 9/00013 382/116 |
| 2006/0227263 A1* | 10/2006 | Kunai | G02F 1/133528 349/96 |
| 2007/0075138 A1* | 4/2007 | Ross | G06K 9/00885 235/435 |
| 2007/0153258 A1* | 7/2007 | Hernandez | G06K 9/00053 356/71 |
| 2007/0165914 A1 | 7/2007 | Werthiem | |
| 2008/0056539 A1 | 3/2008 | Sweeney | |
| 2008/0187190 A1* | 8/2008 | Shin | A61L 2/10 382/124 |
| 2009/0034803 A1* | 2/2009 | Matos | G06K 9/00 382/116 |
| 2010/0101961 A1* | 4/2010 | Lee | B23P 15/24 205/69 |
| 2010/0302210 A1* | 12/2010 | Han | G06F 3/0412 345/175 |
| 2011/0096025 A1 | 4/2011 | Slobodin | |
| 2011/0186712 A1* | 8/2011 | Blenkhorn | B05D 1/42 249/115 |
| 2011/0216948 A1 | 9/2011 | Yalla | |
| 2013/0202182 A1 | 8/2013 | Rowe | |
| 2013/0272585 A1* | 10/2013 | Mueller | G06K 9/0004 382/124 |
| 2014/0337948 A1 | 11/2014 | Hoyos | |
| 2015/0261367 A1* | 9/2015 | Zhang | G06F 3/0412 345/173 |
| 2016/0292491 A1 | 10/2016 | Dickerson | |
| 2016/0379039 A1* | 12/2016 | Dagan | G06F 3/0412 382/124 |
| 2017/0235994 A1 | 8/2017 | Yang | |
| 2017/0316248 A1 | 11/2017 | He | |
| 2018/0225498 A1 | 8/2018 | Setlak | |

FOREIGN PATENT DOCUMENTS

| | | | |
|---|---|---|---|
| CN | 2016100882913 | 2/2016 | |
| EP | 0514182 A1 | 11/1992 | |
| EP | 0867828 A2 | 9/1998 | |
| GB | 2243235 A * | 10/1991 | G06K 9/00 |
| JP | 02149253 A * | 6/1990 | |
| JP | 02149253 A | 6/1990 | |
| JP | 2004171307 A | 6/2004 | |
| JP | 2007529811 A | 10/2007 | |
| KR | 1020090060283 | 6/2009 | |
| WO | WO-9811499 A1 * | 3/1998 | G06K 9/0002 |
| WO | 2008017077 | 2/2008 | |
| WO | 2010056177 A1 | 5/2010 | |
| WO | 2014030129 | 2/2014 | |
| WO | 2014057171 | 12/2014 | |
| WO | 2017105318 A1 | 6/2017 | |

OTHER PUBLICATIONS

Fan, et al. Fractal Design Concepts for Stretchable Electronics. Nature Communications. 07 28,29 Feb. 2014. [Retrieved Jul. 6, 2016). Retrieved from internet<URL: http://www.nature.com/ncomms/2014/140207/ncomms4266/pdf/ncomms4266.pdf> pp. 1-8.

Machine Translation for CN 201610088291.3, filed Feb. 17, 2016, 21 pages.

International Search Report and Written Opinion for PCTIB1756374, dated Jan. 18, 2018, 11 pages.

International Search Report and Written Opinion for PCTIB1756375, dated Feb. 9, 2018. 18 pages.

European Patent Application No. 17860890.7, Extended European Search Report dated Apr. 24, 2020, 7 pages.

Korean Patent Application No. 10-2019-7013803, Notice of Preliminary Rejection dated May 21, 2020, with English translation, 15 pages.

Short, Nathaniel J., et al., "Temporal Analysis of Fingerprint Impressions", 2012 IEEE Fifth International Conference on Biometrics: Theory, Applications and Systems (BTAS), Sep. 23, 2012 (Sep. 23, 2012), XP032276547, DOI: 10.1109/BTAS.2012.6374601 ISBN: 978-1-4673-1384-1, pp. 359-364.

* cited by examiner

SYSTEMS AND METHODS FOR CAPTURING IMAGES USING A PRESSURE SENSITIVE MEMBRANE

FIELD

The disclosure relates to systems and methods for capturing images of objects using a pressure sensitive membrane.

BACKGROUND

A variety of technologies are available for acquiring fingerprints, which include mechanical, optical, opto-electrical, electrical, and/or other methods. Mechanical methods emphasize inks and powders to form physical replicas of fingerprints in a flat format. Optical methods utilize traditional film-based photography. Opto-electrical methods include digital photography and a variety of other ways to convert optical images or local optical effects into electronic records. Electrical methods generate electronic fingerprint records without using intermediary optical effects. Such electrical methods generally include a set of sensors that individually monitor changes in local electrical properties in response to interaction with a small region of a finger.

The generation of electronic fingerprint records may be desired to facilitate the rapid communication and analysis of fingerprint information using advanced telecommunications and computer technologies. Both opto-electrical and electrical fingerprinting methods may be used to make fingerprint acquisition systems with flat formats. Flat formats may be desirable to reduce the size, weight, and potentially the cost of the system, and are thereby marketable as portable devices or subcomponents of personal electronics.

Whereas small (i.e. less than about 1 square cm) electrical acquisition arrays may benefit from the economics of large scale silicon based integrated circuit manufacturing techniques, many fingerprinting applications require acquisition arrays that are about 10 cm by 10 cm or larger. Such large silicon based integrated circuits often become prohibitively expensive due to quality control statistics. This may lead to low effective yields of acceptable quality devices.

Many opto-electrical and electrical fingerprinting methods suffer from high variability in the properties of finger tissue and of the finger surface. Finger properties of concern include moisture, salinity, contamination, reflectance, scattering, ambient light, impedance, resistivity/conductivity, and/or other properties. Even within the same fingerprint, these and other properties may vary significantly from person to person, over time, and over distance. Variability in these finger properties may significantly alter the quality and character of a recorded fingerprint.

Explanation of Total Internal Reflection

It is well known that light travels at different speeds in different materials. A refractive index, $n_i$, of a material, i, is the speed of light in a vacuum, c, divided by the velocity of light in the material, $v_i$: $n_i = c/v_i$. As light passes from one material to another, the change of speed results in refraction. Measured from perpendicular to the surface, the angle of incidence, $\theta_1$, and the angle of refraction, $\theta_2$, are given by Snell's law: $n_1 \sin(\theta_1) = n_2 \sin(\theta_2)$. Accordingly, when light emerges from a glass block ($n_1 \sim 1.5$) into air ($n_2 = 1$), the light will be refracted towards the surface. That is, $\theta_2 > \theta_1$ because $n_1 > n_2$. At a critical angle of incidence, $\theta_c$, $\theta_1$ becomes 90° as the refracted light runs along the glass-air surface to form an evanescent wave. When $\theta_1 > \theta_c$, the incident light is reflected back into the glass by a process called total internal reflection (TIR). By interfering with (i.e. scattering and/or absorbing) the evanescent wave, one may prevent (i.e. "frustrate") the total internal reflection phenomenon.

Systems employing frustrated TIR to obtain images of biometric prints are generally known in the art. The basic principle of these conventional systems is that light, if incident on an interface going from one medium (with $n_1$) to another medium such as air (with $n_2 < n_1$), will be totally reflected if the incident angle is large enough. A camera is generally oriented to image the reflected light. The reflected light may form a white background. However, if material (such as a finger ridge) with a relatively high refractive index makes intimate contact with the interface from the air side, then total internal reflection is disturbed and some of the light is transmitted into the contacting finger ridge, instead of being reflected. Thus, this region appears dark in the camera image. The result is a high contrast fingerprint image.

Challenges for Total Internal Reflection Based Fingerprint Interrogation

Conventional TIR based imaging systems suffer a number of drawbacks. For example, conventional TIR systems may capture incomplete fingerprints from dry fingers, because they do not have enough index matching moisture or oil to make intimate contact with the a prism surface (e.g., glass or plastic). The result is that dry finger prints typically appear as strings of intermittent dots, rather than patterns of continuous dark ridge lines.

Another drawback of conventional TIR based imaging systems is that if a finger is too moist, the valleys between the fingerprint ridges are filled with fluid and the low reflectivity contact area overlaps both the ridges and valleys of the finger. The result is a dark "blob" in the image such that few, if any, fingerprint ridges may be discerned from the image.

Yet another drawback of conventional TIR based imaging systems is the "halo" effect. That is, when moisture emanating from the finger condenses nearby on the prism surface. Since the glass or plastic used to make the prism is typically hydrophobic, the condensate typically forms tiny droplets. These droplets partially prevent TIR and thus appear as a shadow or halo around the fingerprints in the image.

Another drawback is that residual oil on the prism surface of conventional TIR based imaging systems may generate unwanted residual fingerprint images. If an operator does not clean the prism surface often, significant residual fingerprint oil patterns may remain on the prism from previous users. False or confusing composite fingerprints may be captured because of the residual oil.

Conventional TIR based imaging systems have prism surface areas that allow ambient light transmission into the system. Optical filters and light shades may be used to help alleviate effects of ambient light, but only to some degree. For example, capturing fingerprints in full sunlight is typically not possible since the ambient sunlight passing into the system dominates the light signal provided by a light source from the device. Ambient light may cause the camera detector to be saturated, and often no fingerprint image can be detected.

Limitations of Conventional Electrical Fingerprint Characterization Methods

Alternative electrical fingerprint characterization approaches that rely on sensing human tissue directly may suffer from low signal-to-noise ratios. Low signals may occur because the un-optimized electrical properties of human tissue may lead to smaller than desired changes in detected resistance, capacitance, etc. as a function of proximity to or pressure against an electrical readout grid. High noise may occur because of spatial and/or temporal variations in human tissue properties independent of the fingerprint profile itself. These high signal-to-noise ratios may effectively blur or obscure the fingerprint image. This may lead to poor spatial resolution of the collected fingerprint image, even if the readout sensor geometry has sufficiently fine spatial resolution.

Many developers of liquid crystal displays have incorporated touch sensitivity to form "touch screens". These touch screens allow a human finger to control many functions depending on the context. Although low resolution patterns related to an individual's finger are sometimes used to provide basic security and identity functions, it is generally recognized that the present resolution of touch screens is insufficient to produce high quality fingerprints.

Alternative methods that rely on human tissue to directly complete circuits in the readout sensor array depend on highly variable conditions at the tissue sensor interface, such as moisture, sweat, oil, dirt, corrosion, oxidation, variability in the resistance or impedance of human tissue from one person to another, and/or other variable conditions. Repeatedly exposing the electrical contacts to human tissue may reduce the service life of these alternative electrical approaches.

Some electrical fingerprint characterization methods include a film between the finger and the readout grid to protect the electronics. However, these conventional films tend to reduce the sensitivity of the sensing mechanism.

SUMMARY

The disclosure includes innovations which relate to a total internal reflection (TIR) based imaging system as well as other interrogation methods. The TIR based imaging system may include a light transmitting member having an imaging surface (e.g., an interrogation surface, an acquisition surface, etc.). The light transmitting member may be a prism or an optical waveguide.

The TIR based imaging system may include a pressure sensitive membrane. The pressure sensitive membrane may include a top surface, a bottom surface opposite the top surface, and an elastic deformable film forming at least a portion of the top surface. The pressure sensitive membrane may include light absorbing material to block ambient light.

A textured surface may be disposed between the pressure sensitive membrane and the imaging surface. The textured surface may be in contact with at least a portion of the bottom surface of the pressure sensitive membrane or in contact with at least a portion of the imaging surface. The textured surface may hold the pressure sensitive membrane at a default position. The textured surface and/or the pressure sensitive membrane may be formed such that an application of pressure at any location on the top surface of the pressure sensitive membrane may deform the deformable film to reduce a distance between the deformable film and the imaging surface at such location.

The TIR based imaging system may include a light source that may be configured to emit a light towards the imaging surface from a side of the imaging surface opposite the textured surface such that reduced total internal reflection of the light may occur at any location on the imaging surface at which the bottom surface of the pressure sensitive membrane contacts the imaging surface due to pressure exerted on the top surface of the pressure sensitive membrane.

The TIR based imaging system may include a sensor configured to capture the light reflected from the imaging surface.

The pressure sensitive membrane may include optically active materials and/or layers for use with a variety of opto-electrical interrogation systems. Alternative opto-electrical interrogation systems that do not utilize total internal reflection may be used to interrogate the pressure sensitive membrane. For example, the pressure sensitive membrane may include material with florescence and/or scattering behavior.

The pressure sensitive membrane may include electrically active materials for use with a variety of electrical interrogation systems. A planar array of electrical sensors may be used. The electrical sensors may measure changes in electrical behavior of regions of the pressure sensitive membrane that are in contact with or in close proximity with the acquisition surface of the electrical interrogation system.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
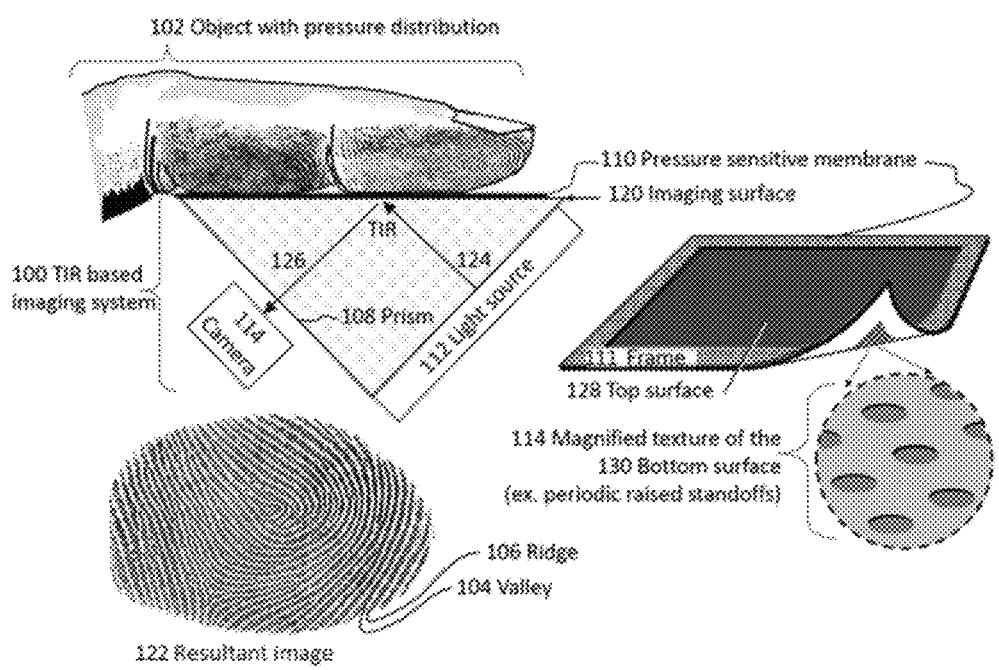
FIG. 1 illustrates an optical configuration of a TIR based imaging system, in accordance with one or more implementations.
Figure 2:
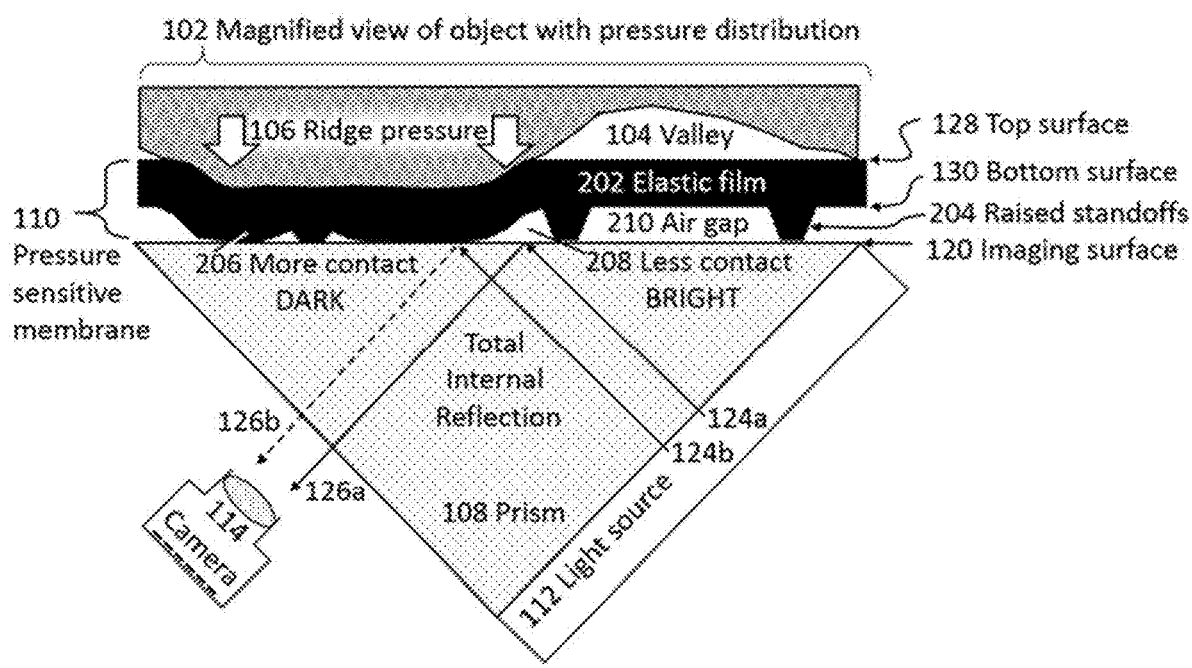
FIG. 2 illustrates an optical configuration of a TIR based imaging system, in accordance with one or more implementations.

FIGS. 1 and 2 illustrate examples of an optical configuration of a TIR based imaging system 100. Although the TIR based imaging system 100 is shown and described with certain components and functionality, other variations may be implemented with fewer or more components to facilitate less or more functionality. As shown in this example, the TIR based imaging system 100 may include a light transmitting member 108. The light transmitting member 108 may be a prism. As shown in FIG. 1, the prism 108 may have a flat hypotenuse forming an imaging surface 120. The imaging surface 120 may reflect light.

The light transmitting member 108 may be made from any material that is transparent to the wavelengths for which they are designed. Common examples of such materials may include glass, plastic, fluoride, and/any other materials. Although light transmitting member 108 is shown to be a triangular shape having a right angle formed by the rectangular sides in FIG. 1, this is merely illustrative. It will be appreciated that light transmitting member 108 may be of any shape having any suitable angle to achieve desired optic effects depending on the application. In some embodiments, prism 108 may not be of a regular geometric shape.

The TIR based imaging system 100 may include a light source 112 and a camera 114. As shown in this example, the light source 112 may be disposed at one side of the light transmitting member 108. The light source 112 may emit a light beam 124 at a prearranged angle towards the imaging surface 120 of the light transmitting member 108. The light source 112 may emit the light beam 124 towards the imaging surface 120 from a side opposite of the imaging surface 120. As illustrated, the light beam 124 may be normally totally internally reflected at the imaging surface 120 of the light transmitting member 108. As shown, the reflected beam 126 may be collected by a camera lens onto a focal plane of a camera 114.

The TIR based imaging system 100 may include a pressure sensitive membrane 110. The pressure sensitive membrane 110 may include a top surface 128, a bottom surface 130 opposite the top surface 128, and an elastic deformable film 202. The elastic film 202 may form at least a portion of the top surface 128. As shown, the pressure sensitive membrane 110 may comprise a textured surface, such as plurality of periodic raised standoffs 204.

The pressure sensitive membrane 110 may be disposed and/or arranged on the imaging surface 120 where TIR occurs, such that when the pressure sensitive membrane 110 is pressed by an object with a pressure distribution against the imaging surface 120, there may be significantly reduced local total internal reflection at regions of higher local pressure. This may enable the camera 114 to image object pressure points as dark features. In some examples, the pressure sensitive membrane 110 may be constructed of a light absorbing material film or a light transparent material that includes light absorbing materials or layers. The pressure sensitive membrane 110 may be flexible in certain examples, as elastic mechanical behavior facilitates repeated use to capture dynamic pressure distributions.

The pressure sensitive membrane 110 may include a frame 111. The frame 111 may include increased stiffness around its perimeter. The frame 111 may be added in some embodiments for various reasons including, but not limited to, helping to remove the pressure sensitive membrane 110 from its original formation surface, providing support for the elastic film 202, applying tension to the elastic film 202, helping the pressure sensitive membrane release from the imaging surface 120 after pressure is released, applying and holding the pressure sensitive membrane 110 near the imaging surface 120, sealing out contamination, dust, or moisture from the imaging surface 120, removing the pressure sensitive membrane 110 from the imaging surface 120, storing the pressure sensitive membrane 110 in a clean area when not in use, defining the desired shape of the pressure sensitive membrane 110 (whether planar or curved), and/or other reasons. Flexibility may allow the pressure sensitive membrane 110 to curve when installed into an electronic device to facilitate mechanical placement of the components in space available positions. The pressure sensitive membrane 110 may bend and still maintain desired optical properties related to TIR of the light generated at the light source 112. In some embodiments, bending the pressure sensitive membrane 110 may allow fingerprints or other pressure distributions to be monitored from a variety of surfaces. In some embodiments, the pressure sensitive membrane 110 may be substantially planar, such as a traditional fingerprint scanner. In some embodiments, the pressure sensitive membrane 110 may have a smooth surface on microscopic regions of the bottom surface 130 to further facilitate modification of TIR. In some embodiments, a reflective coating or light absorbing coating may be applied to a top surface 128 of the pressure sensitive membrane 110 to improve its performance. For example, the optical contrast of the image obtained by the camera 114 may be increased by the presence of a light absorbing and/or light scattering layer or material within the pressure sensitive membrane 110. In this manner, light which is not totally internally reflected may be blocked from propagating to the camera 114 by other indirect routes. Furthermore, a light absorbing, scattering, and/or reflecting layer or material included within or upon the pressure sensitive membrane 110 may prevent ambient light from entering the prism 108 or reaching the camera 114. This may increase the optical contrast of the TIR based imaging system 100.

The pressure sensitive membrane 110 may include a top surface 128. The top surface 128 may include a portion that is substantially planar. The top surface 128 may take a form similar to that of the pressure sensitive membrane 110. The top surface 128 may serve as an object contact interface with the pressure sensitive membrane 110. Contact of, for example, a user's finger with the top surface 128 may deflect the pressure sensitive membrane 110 towards the imaging surface 120 causing at least a partial reduction in the TIR at areas near or under where ridges of the finger contact the pressure sensitive membrane 110. The top surface 128 may be covered with a flexible scratch resistant or wear reducing coating to extend the service lifetime of the pressure sensitive membrane 110. The pressure sensitive membrane 110 may include layers that change its appearance as the electronic device nears the end of its service life.

As illustrated, the pressure sensitive membrane 110 may include a bottom surface 130. The bottom surface 130 may serve as a contact interface with the imaging surface 120. A plurality of periodic raised standoffs 204 (or other textures including features of desired dimensions) may be formed onto the bottom surface 130 of the pressure sensitive membrane 110. The raised standoffs 204 may be formed onto the bottom surface 130 by any means. In the non-limiting example illustrated in FIG. 2, periodic raised standoffs 204 may hold the bottom surface 130 of the elastic film 202 away from the imaging surface 120. In this manner, one or more local air gaps 210 exist when low or no pressure is applied to the elastic film 202. Therefore, there may be less local direct contact 208 between the bottom surface 130 and the imaging surface 120. This air gap 210 and the reduced contact 208 may insure that most of the locally incident light 124a may be totally internally reflected 126a and recorded by the camera 114 as a bright region.

When an object 102 (e.g., a finger) is placed onto the pressure sensitive membrane 110, pressure may be locally applied by one or more ridges 106. This pressure may be transferred to the elastic film 202. Under this pressure by one or more ridges 106, the bottom surface 130 of the elastic film 202 may deform. In this manner, the bottom surface 130 may make significantly more contact 206 with the imaging surface 120 directly under individual ridges 106 than where one or more valleys 104 are present above (but not touching) the pressure sensitive membrane 110. Some incident light 124b may reach regions of the pressure sensitive membrane 110 making more intimate contact 206 with the imaging surface 120. This incident light 124b may be refracted into and absorbed by the constituents of the pressure sensitive membrane 110. Their corresponding reflected rays 126b that reach the camera 114 may have lower intensity. In this way, locations where the pressure sensitive membrane 110 may experience locally higher pressure from ridge 106 may appear as darker portions of the resultant image 122 captured by the camera 114. The optical and mechanical properties of the pressure sensitive membrane 110 may be adjusted so that the local intensity of detected light 126a and/or 126b is a well behaved function of the applied local pressure. As such, the resulting image 122 may represent a two-dimensional plot of the applied pressure distribution.

The resulting image 122 of the pressure distribution of the object 102 (such as a finger) captured by the TIR based imaging system 100 with the aid of the pressure sensitive membrane 110 may be a high quality image. As shown in FIG. 1, the fingerprint ridges 106, valleys 104, pores, and/or other details of the surface of the finger may be captured by the camera 114 with good contrast and a wide dynamic range in gray levels designed to correspond to the anticipated range of local pressure levels. This may be because of the repeatable optical-mechanical properties of the pressure sensitive membrane 110.

The use of the pressure sensitive membrane 110 in the TIR based imaging system 100 may address the drawbacks described above. For example, using the pressure sensitive membrane 110 may not rely on moisture on the object 102 and/or skin oils to make good contact with imaging surface 120 of the light transmitting member 108 to cause frustrated TIR. When used with TIR based imaging systems 100, the repeatable optical mechanical properties of the pressure sensitive membrane 110 convert pressure differences applied by the object 102 at different ridges 106 and valleys 104 on a surface of the object 102 into reflectivity differences at the imaging surface 120. Since moisture or oil conditions may vary non-deterministically on the object 102, the use of a pressure sensitive membrane 110 with a TIR based imaging system 100 may improve the image of the object 102 by generating more uniform contrast between ridges 106 and valleys 104 across the light transmitting member 108. In this way, the pressure sensitive membrane 110 may alleviate the problems of aforementioned dry or wet conditions of the object 102 that lead to poor quality images and/or inconsistent images of the object's true pressure distribution signature.

Using the pressure sensitive membrane 110 with a TIR based imaging system 100 may reduce the aforementioned halo effect in the images captured by conventional TIR based imaging systems. This is because the pressure sensitive membrane 110 may serve as a boundary layer preventing oils and/or moistures on the object 102 from condensing onto the imaging surface 120 of the light transmitting member 108. Furthermore, any condensate formed on the top surface 128 of the pressure sensitive membrane 110 may not add pressure toward the imaging surface 120, and therefore may not be imaged by the camera 114. Similarly, using a pressure sensitive membrane 110 with a TIR based imaging system 100 may reduce residual prints in the image. The presence of the residual prints on the top surface 128 of the elastic film 202 may not translate into pressure variations at the imaging surface 120. Thus, the residual prints may not be imaged for similar reasons that condensate or halos are not imaged.

The pressure sensitive membrane 110 may be flexible enough (as determined by its film thickness and/or effective modulus of elasticity) so that the pressure applied by individual ridges 106 may remain localized, i.e. does not spread out and generate applied pressure under a valley 104. The elastic film 202 of the pressure sensitive membrane 110 and the texture formed thereto may exhibit elastic deformation with minimal plastic deformation. That is, the pressure sensitive membrane 110 may completely spring back and quickly recover its default high reflectivity (low contact area) default position when the object ridge pressure 106 is released from the pressure sensitive membrane 110. This may allow for multiple print images of the object 102 one after another.

In an embodiment, the effective refractive index of the pressure sensitive membrane 110 may be near that of the light transmitting member 108. With such a refractive index of the pressure sensitive membrane 110, the high contact area regions from the ridges 106 may appear as dark regions against the bright background of total internally reflected light. It has been experimentally demonstrated that the pressure sensitive membrane 110 may be formed from materials with a wide range of refractive index values and still produce high quality pressure distribution images. In the absence of object ridge pressure, it may be desirable for an air gap 210 less than a few micrometers ($\mu$m) to form at the imaging surface 120 to generate a brighter background TIR intensity for higher image contrast. This air gap 210 may be facilitated by the presence of selected textures on the bottom surface 130.

The pressure sensitive membrane 110 may be rubbed and/or pressed by many objects during its service time. Under these stresses, the pressure sensitive membrane 110 may stretch excessively, buckle, tear, or degrade by abrasion, oxidation, or chemical changes caused by salts, oils or moisture on the objects, and/or other problems may occur during the service time of the pressure sensitive membrane 110. The pressure sensitive membrane 110 may be structured to block ambient light over the light wavelengths that are used to image object prints. Scratch resistant coatings of harder materials may be applied to the top surface 128 of the pressure sensitive membrane 110. This may extend the service life of the pressure sensitive membrane 110, as long as they do not interfere with the elastic behavior of the pressure sensitive membrane 110 as a whole. Other properties of the pressure sensitive membrane 110 may be used for optimizing the performance of the TIR based imaging system 100.

Example materials of the elastic film 202 may include, but are not limited to, any type of parylene, urethanes, silicones, Kapton, polyester, polypropylene, and/or any other type of flexible polymer substrate film that may exhibit one or more of the aforementioned properties. Parylene C may be an example of a preferred material for the formation of the pressure sensitive membrane 110, because it is relatively inexpensive, has high strength, is thermally stable enough to withstand subsequent processing, may be deposited into extremely thin films only a few microns thick, and/or may be deposited with very uniform film thickness. The well-known vapor polymerization means of achieving uniform parylene C films may lead to the minimization of defects, such as pinholes, tears, cracks, and/or irregular surface features. Furthermore, the conformal deposition of parylene C may allow a textured and/or patterned substrate to act as a mold for reproducing a desired texture engineered to achieve the pressure sensitive behavior described above. Nevertheless, any flexible material that may be capable of intimately contacting the imaging surface 120 may be used to form the pressure sensitive membrane 110 in accordance with this disclosure.

An example of the TIR based imaging system 100 includes using the TIR based imaging system 100 to generate high quality fingerprint images appropriate for identification of personnel by law enforcement agencies. The camera 114 may capture image data at about 1,400 pixels per inch on the imaging surface 120 (so that the image may be reformatted for 1,000 ppi devices) or at about 850 ppi (for 500 ppi devices). In these examples, each pixel is formed from a region of the imaging surface 120 that is about 18 μm by 18 μm (for 1,000 ppi devices) or up to about 30 μm by 30 μm (for 500 ppi devices).

The pressure sensitive membrane 110 may include one or more properties. For example, the pressure sensitive membrane 110 may increase the contact area with pressure over the typical pressure range of an object 102, such as a finger. When the pressure sensitive membrane 110 is laid over the imaging surface 120, the initial contact area may be low so that the image may be processed as white or a relatively light gray scale value, so as not to lose valuable bandwidth for pressure sensitivity. When typical low average total pressure is applied (e.g., approximately 10 kPa for a gentle touch by a finger), a full fingerprint may be registered. As more pressure is progressively applied (e.g., up to an average pressure of 65 kPa), the pressure sensitive membrane 110 may continue to deform to provide additional contact area with the light transmitting member 108.

In another example, the pressure sensitive membrane 110 may include a periodic (or pseudo-periodic, or pseudo-random) pattern of features (such as local variations in density, film thickness, composition, and/or other pattern of features). The periodic pattern of features may include controlled average feature dimensions to form pressure sensitive contact regions across the imaging surface 120. When capturing fingerprint images, the effective periodicity of pressure sensitive contact regions of the pressure sensitive membrane 110 should be small enough to generate fine resolution fingerprints. For example, if the effective periodicity is less than 16.7% of the finger ridge width (e.g., typically about 300 μm wide, but may vary from person-to-person), then the shape of a fingerprint ridge may be imaged by at least 6 regions that are individually less than 50 μm across. Accordingly, the Federal Bureau of Investigation (FBI) has established that one of the criteria for certification of fingerprint imaging devices is that the pixel size be no larger than 50 μm. If the TIR based imaging system 100 is to be certified by the FBI, the periodic regions of the texture on the pressure sensitive membrane 110 should not be much larger than the pixel size in the camera 114 in order to optimize image resolution. Pressure sensitive contact regions smaller than these upper limits may be preferable so as not to limit the resolution of the fingerprint scanner, however smaller features may be more difficult to fabricate economically. There are a wide variety of applications and markets for fingerprint recognition and other pressure distribution imaging that do not require FBI certification, and may function adequately with larger pixel dimensions.

The textured bottom surface 130 of the pressure sensitive membrane 110 may trap pockets of air. The trapped air may prevent the elastic film 202 from touching the imaging surface 120. Thus, the elastic film 202 may not respond to additional applied pressure. However, it may be possible to design the bottom surface 130 so that individual sensors may include a closed pocket of air. The closed pocket of air may help the elastic film 202 recoil away from contacting the imaging surface 120 after applied pressure is removed. Air may be trapped by connected raised features, such as rings, loops, intersecting lines, polygon perimeters, and/or other features that form borders and/or walls, which may block air movement on a microscopic scale. Alternatively, air may be trapped in closed pores in the bottom surface 130 of the pressure sensitive membrane 110. Pores and/or pinholes should not penetrate the top surface 128, as this may allow moisture to pass through the pressure sensitive membrane 110. This may compromise the insensitivity of the pressure sensitive membrane 110 to moisture levels of an object 102, such as a finger.

Figure 3:
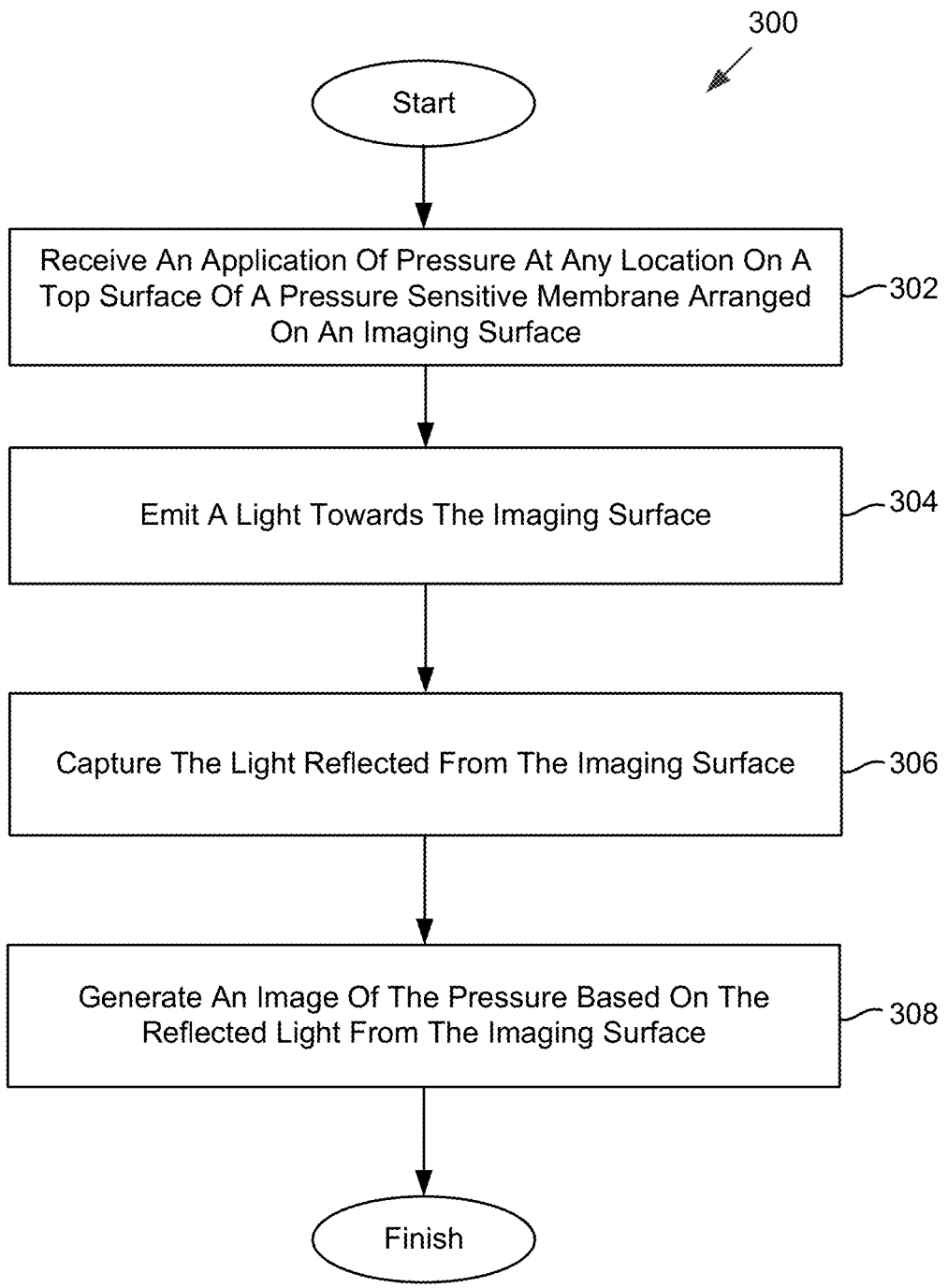
FIG. 3 illustrates a method for capturing an image of an object using a TIR based imaging system, in accordance with one or more implementations.

FIG. 3 illustrates a method 300 for capturing an image of an object using a TIR based imaging system, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, an application of pressure may be received at any location on a top surface of a pressure sensitive membrane arranged on an imaging surface.

At an operation 304, light may be emitted towards the imaging surface.

At an operation 306, the light reflected from the imaging surface may be captured.

At an operation 308, an image of the pressure may be generated based on the reflected light from the imaging surface.

Figure 4:
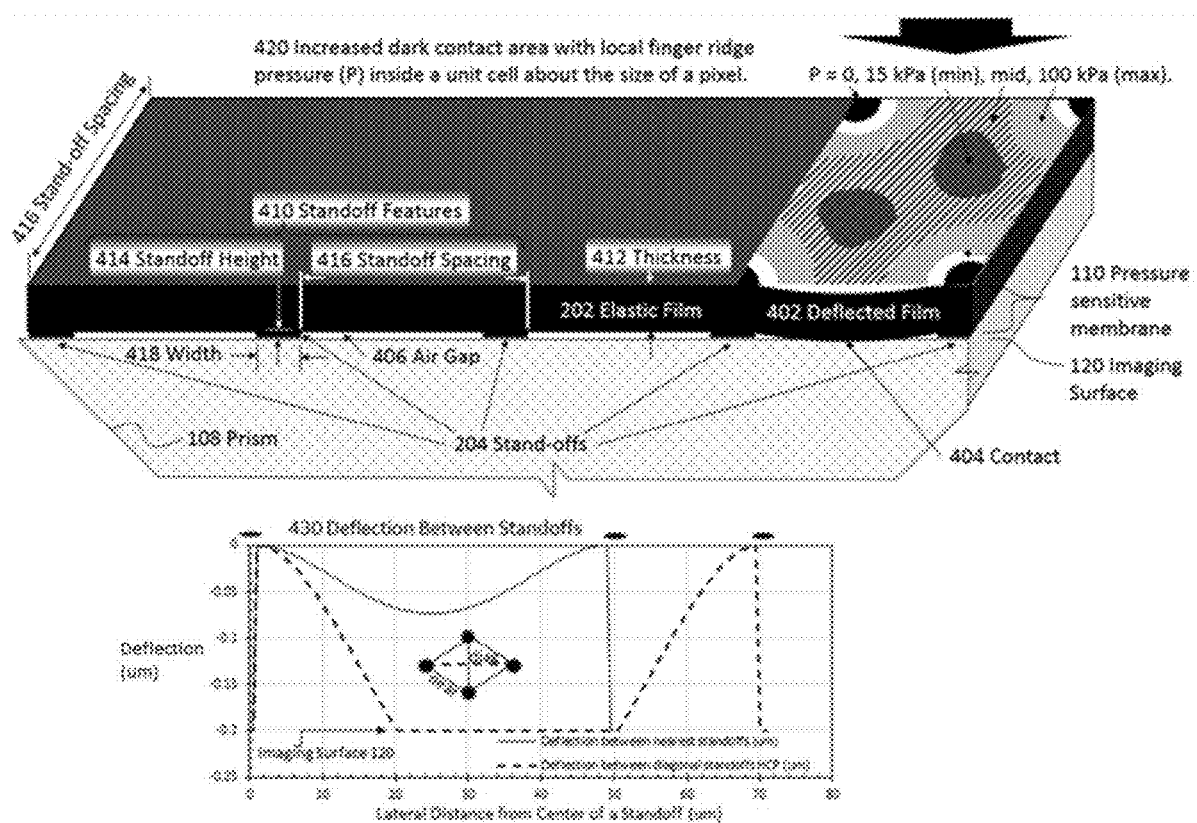
FIG. 4 illustrates a cross-section of a pressure sensitive membrane, in accordance with one or more implementations.

The pressure sensitive membrane 110 shown in FIGS. 1, 2, and 4 may include a texture comprising raised standoff elements 204 on the bottom surface 130 of the pressure sensitive membrane 110. Referring to FIGS. 1, 2, and 4, the texture of the bottom surface 130 may include periodic raised standoff features 410. Standoff features 410 may include geometric features such as standoff height 414, standoff width 418, standoff spacing 416, and/or thickness 412 of the elastic film 202. In the air gap 406 where the there is no pressure (e.g., for example, fingerprint valley 104 may be placed over air gap 406), the air gap 406 may have a predetermined height (e.g., the standoff height 414). As illustrated, in the area 402 where the object 102 pressure (e.g., for example, a fingerprint ridge 106 may compress the pressure sensitive membrane 110), the elastic film 202 may deflect to make contact 404 with the imaging surface 120 of the prism 108. As shown in the upper right corner of FIG. 4, the progressively larger regions where the pressure sensitive membrane 110 may contact the imaging surface 120 are shaded for progressively increasing applied object pressure 420. The pressure sensitive membrane 110 may be made from a dense parylene C film that is between 2 μm and 10 μm thick, with 0.5 μm to 5 μm wide standoffs that are 0.2 μm to 1.0 μm high and are spaced 20 μm to 100 μm apart.

In some embodiments, the texture of the standoffs of the pressure sensitive membrane 110 shown in FIG. 4 may be cast from patterns etched into silicon wafers. Using modern silicon lithography processing techniques, a silicon wafer may be etched to generate holes or lines of any conceivable shape or size and in a variety of array patterns. This process may allow the standoff features 410 to be controlled. Such a wafer may act as a master mold from which the pressure sensitive membrane 110 may be cast. In a non-limiting example, by adding an appropriate release agent before applying a polymer film or other flexible film material, the pressure sensitive membrane 110 may be removed as a cast textured film from such a mold, retaining the textured features of the mold. It may be understood that silicon wafers have the added benefit of being relatively inexpensive precursors, which are relatively thin, lightweight, and strong enough to be reused many times. The polished surfaces of silicon wafers may be inherently smooth enough to facilitate releasing the cast film and to facilitate intimate contact with the imaging surface 120 under applied pressure.

In an example of a pressure sensitive membrane 110 that has been reduced to practice using periodic standoffs, a dense parylene C elastic film with a thickness of ~3.5 μm was deposited on a silicon wafer. The silicon wafer had a pattern of circular pits ~2 μm diameter etched ~0.3 μm deep and spaced ~50 μm apart in a hexagonal close packed array. Prior to parylene deposition, the silicon wafer was spin coated with a release agent, namely a 2% aqueous solution of micro-90 concentrated cleaning solution, which left a soap film about 18 nm thick. The etched pits in the silicon wafer master mold generated standoffs in the cast parylene film with essentially the same geometry as the etched pits.

The pattern of features of the pressure sensitive membrane 110 should not create a moiré pattern relative to the camera pixels. Moiré patterns may be avoided by randomizing feature positions within a prescribed range of average lateral periodicity. Moiré patterns may be avoided when the standoff spacing 416 or lateral periodicity of the pressure contacts is equal to or significantly smaller or larger than the effective pixel size on the imaging surface 120. The aspect ratio of the suspended length between contacts relative to the thickness of the pressure sensitive membrane 110 should be optimized to enable desired deflection behavior. The thickness of the pressure sensitive membrane 110 may be large enough to be robust and freestanding. The pressure sensitive membrane 110 may be thin enough to transfer the local pressure variations of the object 102 to the imaging surface 120 without compromising the required resolution.

Figure 5:
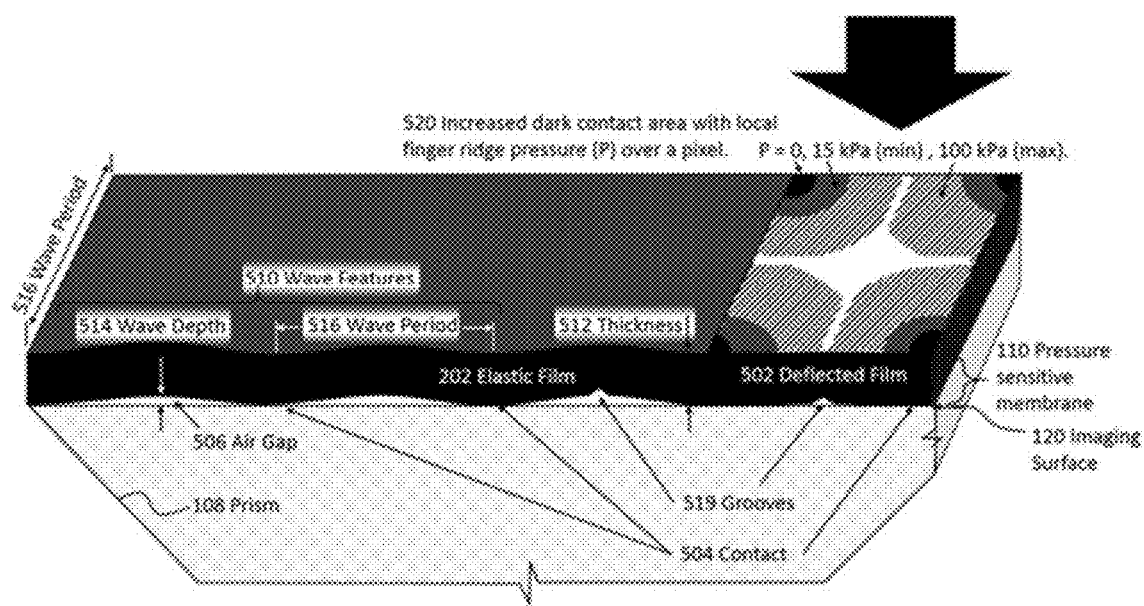
FIG. 5 illustrates a cross-section of a pressure sensitive membrane, in accordance with one or more implementations.

Referring to FIGS. 1 and 5, FIG. 5 illustrates a cross-section of the pressure sensitive membrane 110 having a texture that may be cast from a holographic grating (unidirectional or bidirectional), in order to achieve a smooth sinusoidal wave texture. This is not meant to be a limitation of this disclosure, as other methods of generating thin elastic films with a wave surface texture may be used. As shown in this example, the pressure sensitive membrane 110 may have a texture 115 comprising wave features 510 formed onto the bottom surface 130 of the pressure sensitive membrane 110. Wave features 510 may include features such as wave depth 514, wave period 516, and/or thickness 512 of the elastic film 202. In areas where there is no or little applied pressure (such as under object 102 valley 104), the predetermined wave depth 514 may produce periodic air gaps 506, which may be imaged as bright regions, as discussed above. The wave texture may have a defined wave period 516, so that the elastic film 202 may form periodic microscopic contacts 504 with the imaging surface 120. In regions where pressure is applied (such as from object 102 ridge 106), the elastic film 202 may deflect 502 towards the imaging surface 120 to enlarge the contact regions 504. As shown on the upper right side of FIG. 5, the regions of progressively more contact area 520 with the imaging surface 120 are shaded for progressively increasing applied object pressure, and are imaged as progressively darker pixels by the camera 114. Such a film cast from a bidirectional grating is one non-limiting example of a texture that traps individual pockets of air 506 under each pixel. As illustrated in FIG. 5, trapped air pockets 506 may be avoided by adding grooves 519 to the wave texture.

It may be understood that although the pressure sensitive membrane 110 as shown in FIGS. 1, 2 and 4 comprises flat regions between periodic standoffs 204, this is not meant to be a limiting feature of the present disclosure. In addition to the wave texture illustrated in FIG. 5, other configurations of the texture of the pressure sensitive membrane 110 may be possible. In some embodiments of a pressure sensitive membrane 110, the texture on the bottom surface 130 may be generated by features that are characterized by a wide range of feature scale, dimensionality, shape, and connectivity. Illustrative examples of the wide range of possible texture properties are illustrated in FIG. 6, including but not limited to fine celled foam 630, rough microstructures 610, and nano wire parylene 620.

Textures with a wide range of dimensionality may be used to provide pressure sensitive optical-mechanical behavior supporting the function of the pressure sensitive membrane 110. Dimensionality may refer to the number of dimensions that are needed to describe the primary subcomponent structures of the texture. The dimensionality may be near 0 for point defects and/or nanoscale inclusions. The dimensionality may be near 1 for linear, filamentary, columnar, and/or fibrous subcomponents. The dimensionality may be near 2 for planar interfaces, sheets, and/or ultra-thin layered subcomponents. The dimensionality may be near 3 for volumetric phases, objects, and/or shaped subcomponents. In a wide variety of cases, the dimensionality of a texture may be on a continuum within the range from 0 to 3. Dimensionality may not be a limiting characteristic of the textures applied to the bottom surface 130 of the pressure sensitive membrane 110. To illustrate this point, the three non-limiting examples of useful textures shown in FIG. 6 may be characterized by different levels of dimensionality. Rough surfaces 610 may have a dimensionality near 3, while nano wires 620 may have a dimensionality near 1, and fine celled foam 630 may have dimensionality near 3. While not illustrated, textures with other dimensionality and alternative textures with similar dimensionality may be included and may be used to achieve the desired behavior of the pressure sensitive membrane 110 within the scope of this disclosure.

Textures with a wide range of phase connectivity may be used to achieve the desired optical-mechanical behavior of a pressure sensitive membrane 110. Connectivity may describe the degree to which it is possible to move from one region (point A) of a given material to another region of the same material (point B) along a path that stays within that same material, and therefore does not need to cross into a separate material to go from point A to point B. FIG. 6 illustrates three non-limiting examples of pressure sensitive membranes 110 that employ textures with different levels of connectivity. In one non-limiting example, a rough surface 610 may contain a solid material that may be well connected, while the air of this same rough surface may be connected. In another non-limiting example, the textured bottom surface 130 of the pressure sensitive membrane 110 may contain a fine celled foam 630. A fine celled foam 630 may contain a plurality of air pockets (or other fluid material) within an elastic matrix. The fine celled foam 630 may be closed celled, open celled, or a mixture thereof. The air phase in a closed-celled foam may not be connected, while the matrix of a closed-celled foam may be fully or partially connected. In an open-celled foam, the air may be connected, while the matrix may be connected or partially connected. As illustrated in FIG. 6, voids 633 in the fine celled foam 630 along the bottom surface 130 of the pressure sensitive membrane 110 may reduce the effective refractive index in a region experiencing low pressure 140, such as finger valley, so that these regions may experience TIR and appear bright to the camera 114. If these voids are compressed 635 by the application of local pressure, for example by a finger ridge, then the local effective refractive index of this part of the pressure sensitive membrane 110 that is in contact with the imaging surface may be increased to the point that TIR is "frustrated" so that this region would appear dark to the camera. In another non-limiting example, the bottom surface 130 of the pressure sensitive membrane 110 may comprise a plurality of nano wires 620 or filaments of other sizes larger than nano scale features. These filaments may have a wide range of orientations. In a non-limiting example, filaments may have a "shag carpet" orientation, in which the air in such a filamentary structure may be connected, while the filament material may not be connected or may be intermittently connected. Other filamentary orientations, such as "spaghetti" like structures, matted straw, felt, weaves, tangles, mats of any other fiber orientation may be used to form a texture of the pressure sensitive membrane 110.

Figure 6:
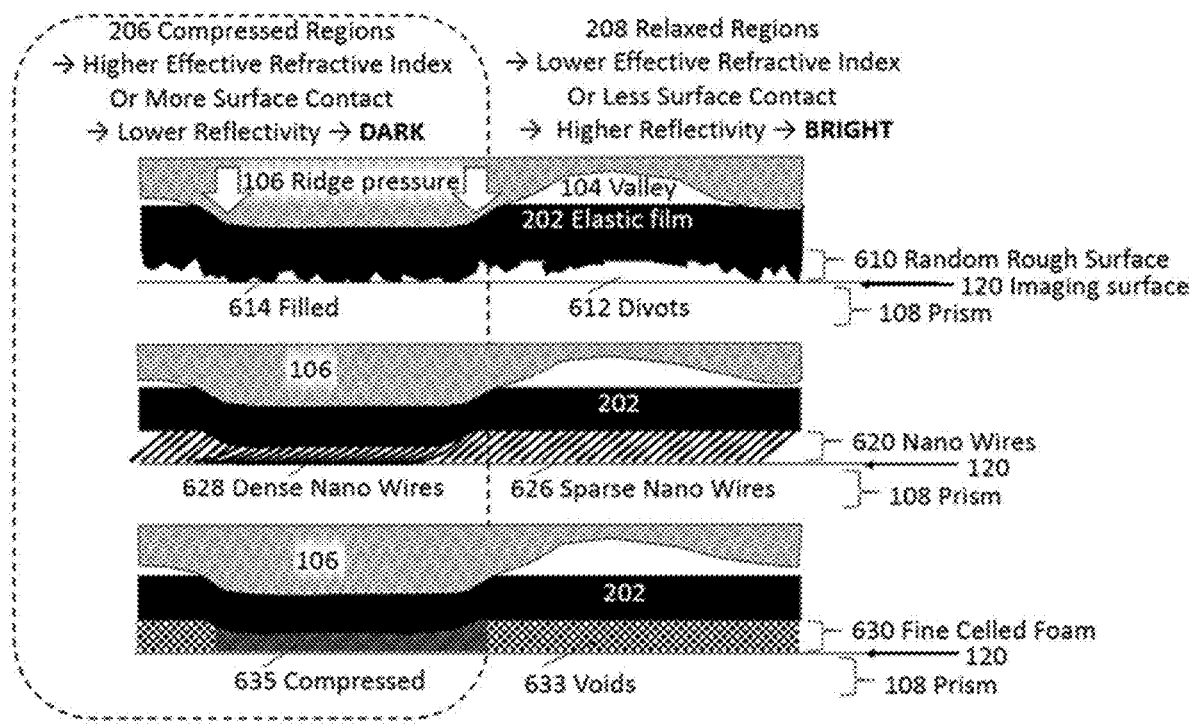
FIG. 6 illustrates additional cross-sections of a pressure sensitive membrane, in accordance with one or more implementations.

The texture features illustrated in FIG. 6 may produce the desired pressure sensitive optical-mechanical behavior whether the features are larger than, similar to, or smaller than the optical interrogation wavelengths, although different explanations may be employed depending on the size of the features. In general, if the primary texture features are larger than the optical interrogation wavelengths, then the pressure sensitive response may be evaluated in terms of the increase in contact area at the imaging surface 120 with applied pressure. If the features are similar to or smaller than the optical interrogation wavelengths, then the pressure sensitive response may be more understood as pressure sensitive changes in evanescent wave coupling, optical tunneling, constructive or destructive interference, and/or the effective local refractive index of the material near the imaging surface 120.

Referring back to FIG. 2, a non-limiting example of evanescent wave coupling and interference effects being reduced to practice to image fingerprints may be described. A pressure sensitive membrane 110 may be fabricated with raised standoffs 204 that are 0.2 µm high and interrogated using a light source 112 with a wavelength λ equal to 0.535 µm. When finger ridge pressure 106 moved the planar bottom surface 130 to a distance of 0.401 µm (1.5λ/2) from the imaging surface 120 (with the raised standoffs 204 not touching the imaging surface 120), destructive interference may cause the pressure sensitive membrane 110 to appear dark. Likewise, when the planar bottom surface 130 is a distance of 0.267 µm (1.0λ/2) from the imaging surface 120, constructive interference may cause the pressure sensitive membrane 110 to appear dark. As local ridge pressure 106 deforms the bottom surface 130 to a distance less than λ/2 from the imaging surface 120, significant coupling may occur between the evanescent wave propagating along the imaging surface 120 and the bottom surface 130 of the elastic film 202, even without direct contact, resulting in progressively darker imaged regions as the air gap 210 becomes progressively smaller.

Referring back to FIG. 6, in a non-limiting example, the pressure sensitive membrane 110 may be comprised of an elastic film 202 with a random rough surface 610. In its undeformed state, the rough surface 610 may include occasional larger protrusions that extend further than the average protrusions from the elastic film 202 and therefore may make sparse contact with the imaging surface 120. Between these sparse contacts, there may be divots 612 between the imaging surface 120 and the elastic film 202 which form microscopic air gaps between the elastic film 202 and the imaging surface 120. In regions with negligible applied local pressure 208, these microscopic air gaps in the rough surface texture 610 may allow most of the light which is incident upon the imaging surface 120 to continue to exhibit total internal reflection, so that such regions of low surface contact 208 may be imaged as bright regions by the camera 114. Where the object being tested has a ridge 106 that applies pressure to the pressure sensitive membrane 110, the divots 612 may be partially filled (e.g., 614) as the rough surface 610 is pressed against the imaging surface 120. Such compressed regions 206 of the rough surface 610 may progressively make more contact with the imaging surface 120, which may progressively reduce total internal reflection at the imaging surface 120, so that these regions of locally higher pressure 206 may be recorded as darker regions by the camera 114.

Not all random rough surfaces 610 may provide the desired pressure sensitive behavior. Experimentally, it has been observed that deeper textures in stiffer materials may not reduce TIR with manually applied pressure. On the other extreme, shallower textures in materials with a lower elastic modulus may not increase TIR as pressure is released. Therefore, for a given material with its elastic modulus, there may be a limited range of texture depth that provides a useful pressure sensitive TIR response.

In another example, the pressure sensitive membrane 110 may comprise an elastic film 202 and a bottom layer 130 with a nano-texture. As illustrated in FIG. 6, the nano-textured layer may comprise a plurality of nano wires 620 or filaments. In this example, nano wires 620 are comprised of parylene (or any other material, such as but not limited to nanowires of metal, semiconductor, insulator, polymer, DNA, RNA, or carbon nanotubes), and other possible components discussed previously. As shown in FIG. 6, the nano wires 620 may be deposited on one side of the elastic film 202 such that the nano wires 620 form a contact layer with the imaging surface 120 of the light transmitting member 108. In some examples, the nano wires 620 may be deposited on the elastic film 202 using oblique angle vapor deposition. The nano wires 620 may be a form of parylene grown by oblique angle vapor deposition such as described in U.S. Pat. Nos. 8,647,654, 8,603,623, and 8,652,632, which are incorporated by reference herein. The nano wires 620 may be columnar, helically columnar, chevron shaped, chiral shaped, distinct or interwoven, and/or any other suitable shape. In implementations, depositing nano wires 620 may include pyrolizing the para-xylylene derivative polymer into a vapor of monomers, directing the vapor of monomers towards the surface, rotating, or translating the surface, or keeping the surface stationary, polymerizing the monomers on the surface, and/or any other operations. A few properties of the nano wires 620 may be desired. For instance, without limitation, in some examples, the parylene nano wire 620 diameter and/or the spacing between nano wires 620 may be significantly smaller than wavelengths of visible light, which is typically between 400 nm and 800 nm. In one example, the nano wires 620 may be of columnar shape, and the column diameter may be from 50 nm to 100 nm, and the average spacing between columns may be from 100 nm to 200 nm.

When the texture features are smaller than the optical interrogation wavelengths, it may be helpful to discuss the optical-mechanical behavior near the imaging surface 120 in terms of the average or effective refractive index, $n_{eff}$, of the bottom layer 130 of the elastic film 202. The TIR mechanism between regions described and illustrated herein depends on the $n_{eff}$ of individual regions over distances on the order of the wavelength dimension. The $n_{eff}$ may be approximated using a rule of mixtures, $(n_{eff}=f_1*n_1+f_2*n_2+\ldots)$ which is a volume fraction $(f_i)$ weighted average of the component refractive indexes $(n_i)$. This is not meant to be a limitation of this disclosure, as other formulas may be used to estimate $n_{eff}$, depending on the microstructure of the components.

The optical-mechanical behavior of an example case of slanted parylene nano wires 620 on the bottom surface 130 of the pressure sensitive membrane 110 is illustrated in FIG. 6 and will be described with reference to FIG. 1. In this non-limiting example, the light transmitting member 108 may be a BK 7 glass prism with a refractive index of 1.515. In this example, the elastic film 202 may be made of parylene-C which has a refractive index of 1.64. Furthermore, a textured layer of slanted nano-featured parylene columns 620 may be deposited on the bottom surface 130 of the elastic film 202. It is reported that there may be approximately 50% void fractions between the parylene nano wires 620, so that in the middle of the nano wire parylene layer, $n_{eff}$ is 1.32. On the outer surface of the nano-parylene layer, some nano wires 620 may have grown taller than neighboring nano wires 620, so that the net volume fraction of parylene in the outer most layer of parylene nano wires 620 may be reduced to 10%, which reduces the corresponding $n_{eff}$ to 1.064 in the sparse nano wires region 626 of the pressure sensitive membrane 110 that is closest to the imaging surface 120. Therefore in relaxed regions 208 with little or no applied local pressure, there are sparse nano wires of parylene 626, and the light which is incident upon the imaging surface 120 of the prism experiences an effective refractive index just beyond the prism which is approximately that of air, n=1. Therefore light that is incident upon relaxed regions 208 of sparse nano wire parylene 626 undergoes TIR because the angle of incidence (45°) is larger than the critical angle for TIR between Bk7 and air, and so this region may be recorded as a bright region by the camera 114. In contrast, where the pressure sensitive membrane 110 is compressed, such as at areas 206, many of the slanted nano wires 620 may bend and lay down nearly parallel with the imaging surface 120, so that the nanoscale air gaps become smaller, and the void fraction between dense parylene nano wires 628 decreases accordingly. For example, if the void fractions at areas 206 are reduced to 20% due to pressure, then $n_{eff}$ becomes 1.515, which is about the same refractive index as a glass prism. Under these conditions, light incident upon the imaging surface 120 from inside the prism 108 experiences a refractive index just beyond the prism which is the same as the refractive index inside the prism, and so the light continues to propagate into the pressure sensitive membrane 110 where it may be scattered and/or absorbed. This region may appear dark to the camera 114. In this way, a texture of parylene nano wires 620 converts differences in pressure between the object 102 ridges 106 and valleys 104 into differences in reflectivity at the imaging surface 120.

Other textures for a pressure sensitive membrane 110 working with a TIR based imaging system 100 may include textures cast from specially prepared surfaces. For example, without limitation, silicon wafers may be etched with or without masks. Even without masks, corrosive reagents may attack defects in silicon wafers, resulting in etched pits. The shape of these pits may depend on the etching reagent. For example, pyramidal pits may be produced using alkaline etchant solutions. Other surfaces such as glass, metals, or ceramics may be polished to achieve smooth surfaces, or they may be physically or chemically treated to create a surface roughness with control over the texture feature size. Example surface texturing processes may include but are not limited to spray painting, sanding, sandblasting, chemical etching, vapor deposition, and/or natural growth of adhering particles such as cells, bacteria, fungi, and/or lichens. Surfaces may be sprayed with particulates that either remove material from the surface or add material to the surface in order to create a controlled texture with desired features and dimensions. These are not meant to be a limitation of this disclosure, as other processes may generate a master mold texture that may be cast onto an applied elastic film 202. Textures may be formed onto the elastic film 202 without using a casting process.

A wide variety of other textures and patterns may be formed directly on the elastic film 202 through subtractive processes such as etching and/or additive processes such as deposition or growth of layers of various materials. Texture features may be applied to a smooth elastic film 202 by other processes, such as but not limited to any printing process, nucleation and growth, patterned seeded growth, lithography, spray techniques, and/or a wide variety of other additive or subtractive processes. Elastic films 202 may be treated to achieve a matte finish.

Other variations of the general design principles described herein may be implemented by those skilled in the art of film deposition and texture generation. It may be appreciated by one skilled in the art that other methods may be employed to produce pressure sensitive membrane 110 having textures in accordance with the disclosure. For example, other methods have been developed for texturing polymer films. It should be understood that the methods of producing various textures for the pressure sensitive membrane 110 described above are not intended to be limiting. For example, the pressure sensitive optical behavior of the pressure sensitive membrane 110 may be produced by incorporating textures or structures of various other materials with elastic components.

Interrogation Via Fluorescent Light Scattering

To enable the pressure sensitive membrane to be interrogated via fluorescent emission, the elastic film may incorporate fluorescent dyes, luminescent or phosphorous particles, fluorescent nanoparticles, and/or quantum dots. For fluorescent or scattered light interrogation, the bottom surface may be made of a material that is transparent to both the excitation and emission wavelength of the fluorescent material. The concentration of fluorescent material in the bottom surface may be optimized so that the optical "skin depth" (i.e. the distance over which the propagated signal is reduced by one order of magnitude) is approximately the same as a thickness of the elastic film. If the concentration of fluorescent material is too high, the potential emitted fluorescent signal may be lost to self-absorption. If the concentration of fluorescent material is too low, the interaction of excitation light with fluorescent material may be diluted. In order to ensure that the imaging surface remains optically smooth, it may be beneficial to reduce the concentration of fluorescent material at the optical interface. The top surface may include light absorbing or reflecting material designed to block ambient light in order to minimize absorption of excitation or fluorescent light rays.

Light scattering particles, materials, and/or features (such as, but not limited to, void inclusions, and/or interfaces with materials of different refractive index than the matrix of the membrane) may be incorporated into the bottom surface. The pressure sensitive membrane may be interrogated from a camera angle approximately normal to the imaging surface. It may be necessary to limit the concentration of light scattering material present at the lowest boundary of the pressure sensitive membrane so that the pressure sensitive membrane mat conform to the imaging surface under applied pressure. The size of the light scattering features may be similar to the wavelengths of light that may be used for excitation and evaluation of the imaging surface.

Various optical element geometries may be used to facilitate interrogation of the pressure sensitive membrane via fluorescence or light scattering. A key advantage of this interrogation approach is that a light collection plane (normal to the axis of the camera optics) may be parallel to the imaging surface. This may provide the fingerprint image with minimal trapezoidal optical distortions. For high contrast imaging of pressure distributions via fluorescent or scattered emissions, the excitation rays may be incident upon waveguide surfaces at angles near the critical angle for total internal reflection. As a non-limiting example, if the waveguide is made of BK7 glass, the incident angle may be ~45° from normal to the imaging surface as measured within the waveguide. By orienting the excitation light rays at angles significantly different than normal to the surface, this geometry forms a spatial filter which separates a portion of the emitted light (i.e. those rays emitted nearly normal to the imaging surface) from the excitation light. To minimize collection of excitation background light rays by the camera, the excitation rays may be reflected from the imaging surface at angles that lie outside of the collection cone angle of the camera optics. For example, a conventional prism of any type may be truncated to form a collection plane that is parallel to the imaging surface. Another non-limiting geometric example is a planar waveguide with two parallel surfaces, including the collection plane and the imaging surface. Other geometries may also be used to interrogate via fluorescence or light scattering.

Figure 7:
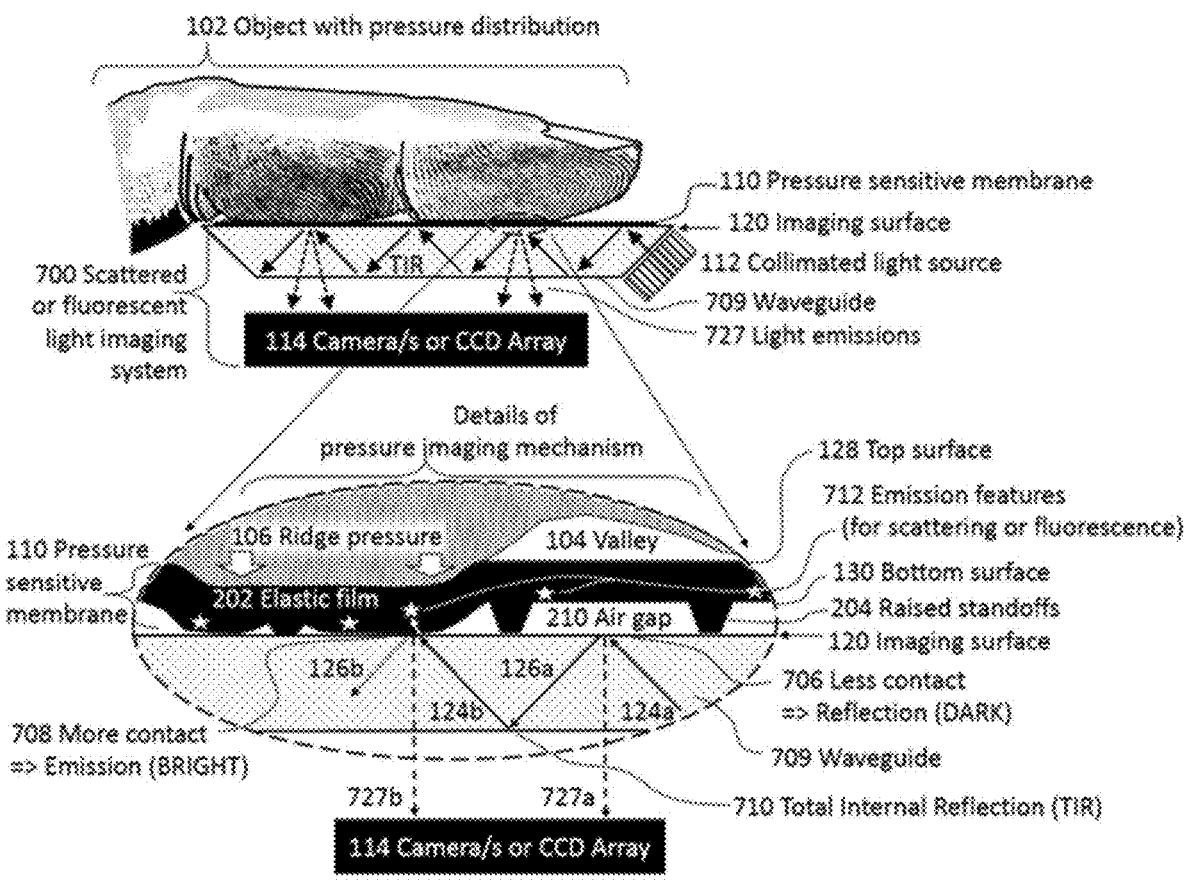
FIG. 7 illustrates a fluorescent or scattered light imaging system, in accordance with one or more implementations.

FIG. 7 illustrates an example embodiment of a scattered or fluorescent light imaging system 700. The scattered or fluorescent light imaging system 700 may acquire images from an object with pressure distributions 102 using scattered or fluorescent light emissions 727. The scattered or fluorescent light emissions 727 may be produced from interactions with one version of the pressure sensitive membrane 110 and the imaging surface 120 of an optical element such as a waveguide 709. Collimated light sources 112 may be positioned at the perimeter of the waveguide 709, so that incident light rays 124a reach the imaging surface 120 at an incident angle which is near the critical angle for TIR 710. Therefore, without applied pressure from an object 102 or without a pressure sensitive membrane 110, this light would continue to propagate within the waveguide 709 via TIR 710.

In the example shown in FIG. 7, the pressure sensitive membrane 110 may include raised standoffs 204. The raised standoffs 204 may produce air gaps 210 between the elastic film 202 and the imaging surface 120 in regions of low applied pressure, such as a fingerprint valley 104. When selected incident light rays 124a strike regions with low applied pressure, there is less contact 706 with the elastic film 202, so that most of the light energy is reflected 126a and continues to propagate along the waveguide 709 via TIR 710. Other incident light rays 124b may reach regions that have more contact 708 between the imaging surface 120 and the pressure sensitive membrane 110 due to applied pressure from ridge 106. In this case, due to the intimate contact, the intensity of reflected light rays 126b may be reduced, because some of the incident light energy may be refracted into the elastic film 202. When this refracted light interacts with emission features 712 located near the bottom surface 130 of the pressure sensitive membrane 110, a portion of this light may be re-emitted 727 in a wide variety of directions as either scattered light or fluorescent emissions, depending on the optical properties of the emission features 712. The portion of these emissions 727b from areas of more contact 708 which happens to be propagating towards the cameras and/or CCD array 114 may then be detected as local bright spots. In this way, ridge regions of higher pressure 106 may be recorded by the cameras or CCD array 114 as bright pixels, while valley regions of low pressure 104 may be recorded as dark pixels because the intensity of emissions 727a from areas of less contact 706 may be minimal, due to negligible local film excitation from the light source 112.

Figure 8:
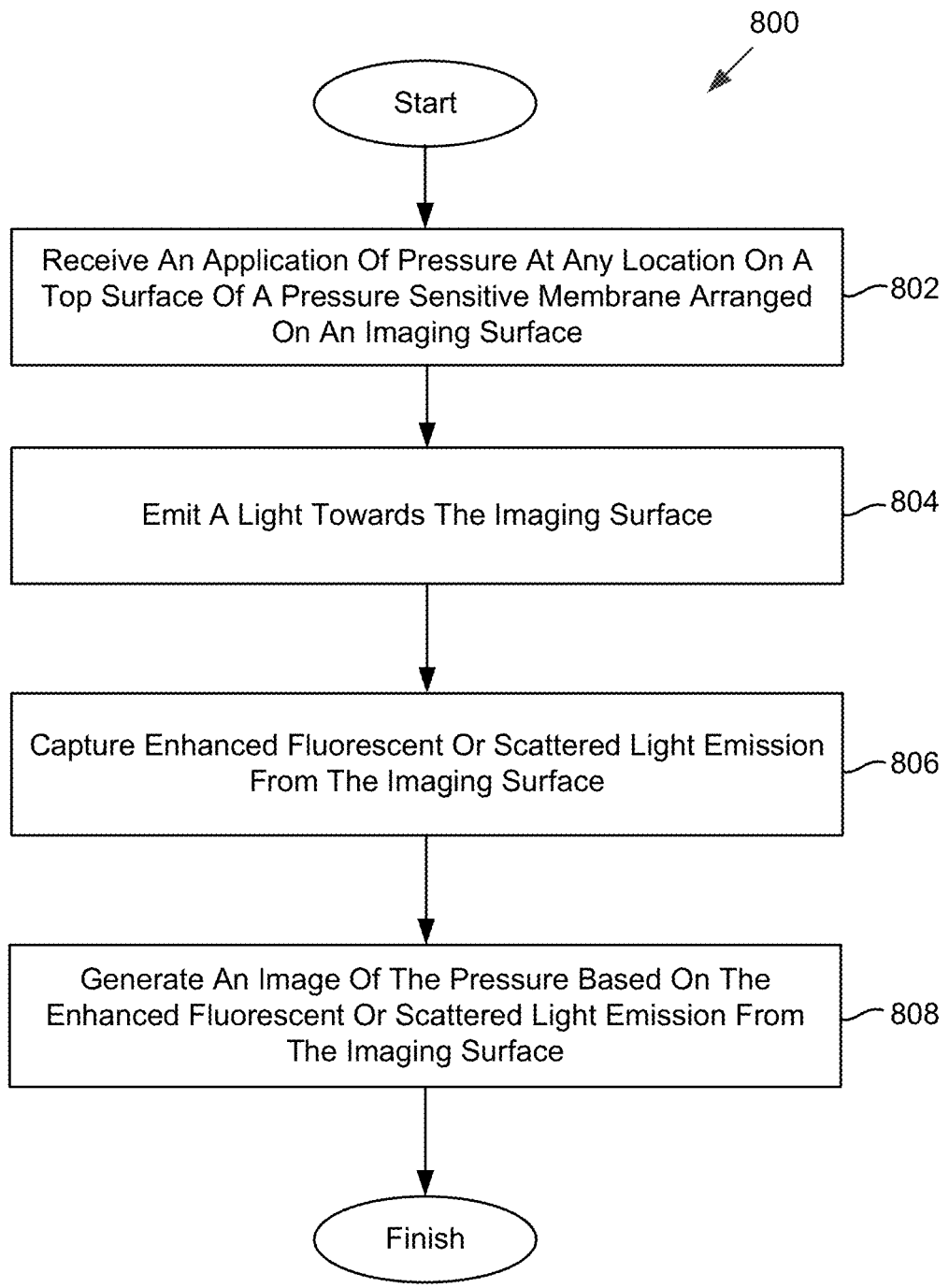
FIG. 8 illustrates a method for capturing an image of an object using a fluorescent or scattered light imaging system, in accordance with one or more implementations.

FIG. 8 illustrates a method 800 for capturing an image of an object using a fluorescent or scattered light imaging system, in accordance with one or more implementations. The operations of method 800 presented below are intended to be illustrative. In some implementations, method 800 may be accomplished with one or more additional operations not described, and/or without one or more of the operations discussed. Additionally, the order in which the operations of method 800 are illustrated in FIG. 8 and described below is not intended to be limiting.

In some implementations, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, an application of pressure may be received at any location on a top surface of a pressure sensitive membrane arranged on an imaging surface.

At an operation 804, light may be emitted towards the imaging surface.

At an operation 806, enhanced fluorescent or scattered light emission may be captured from the imaging surface.

At an operation 808, an image of the pressure may be generated based on the enhanced fluorescent or scattered light emission from the imaging surface.

Electrical Interrogation

Another embodiment of this disclosure may include a pressure sensitive membrane that converts applied local pressure distributions into altered local distributions of electrical properties such as resistance-conductance, capacitance, inductance, and/or magnetic field. These electrical properties may be measured using a readout grid. A readout grid may include a two-dimensional array of sensors and/or junctions between overlapping (but electrically isolated) rows and columns of conductor lines, and other supporting electronics. The junctions between nearby contact pads of intersecting rows and columns may form part of the electronic readout pixels at given coordinates. Novel and traditional methods of electrically characterizing pressure distributions using various versions of the pressure sensitive membrane are described below. The pressure sensitive membrane described in this disclosure may be used as an accessory to improve the performance of existing or future sensor grid readout systems in order to improve the quality of the acquired pressure distributions or fingerprints. As non-limiting examples, the electrically active pressure sensitive membrane may be used to replace the thin glass cover in conventional touch screens, smart phones, and/or flat panel displays, in order to improve the effective pressure distribution resolution. Although conventional touch screens may theoretically acquire fingerprint images, the actual fingerprint quality acquired may be limited by the stiffness of the glass cover protecting the electronics, and therefore the effective fingerprint feature resolution may be undesirably low.

With this embodiment, high resolution pressure distributions (such as fingerprints) may be read electrically by a readout grid in a thin, flat-panel format, based on the local electrical properties of the pressure sensitive membrane at individual coordinates. For example, higher local applied pressure may produce higher local measured conductance or capacitance with appropriate design optimizations. The design of the membrane and the readout grid may enable economical manufacturing techniques to make robust 2-D pressure sensor arrays with high yield.

Figure 9:
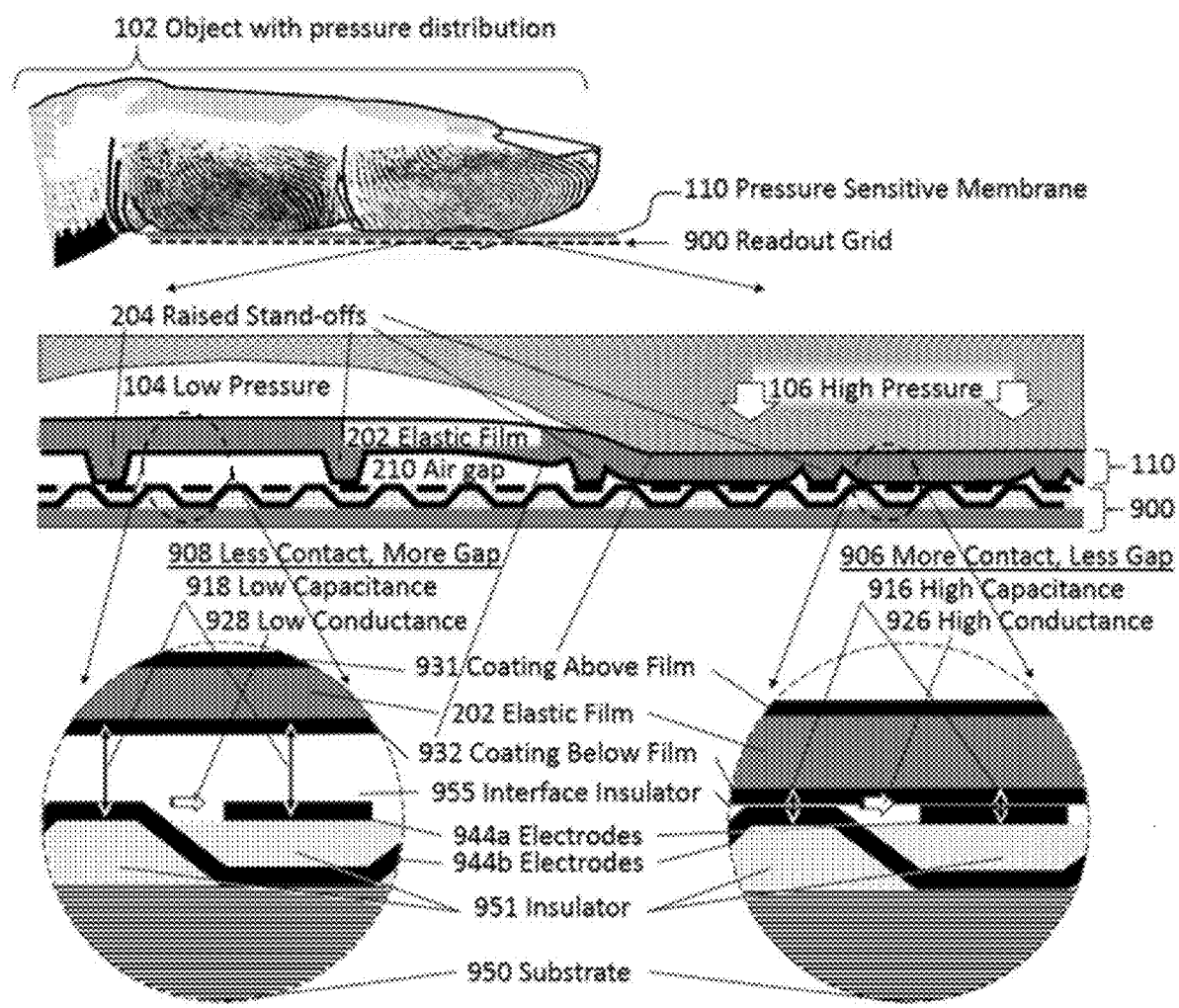
FIG. 9 illustrates a pressure sensitive membrane in conjunction with an electrical readout grid, in accordance with one or more implementations.

General features for electrical interrogation may be illustrated in FIG. 9. An electrically tailored pressure sensitive membrane 110 may be placed between an object with a pressure distribution 102 and an electrical readout grid 900. The pressure sensitive membrane 110 may include an elastic film 202. The elastic film 202 may include textured features. The elastic film 202 may include one or more optional coatings above the elastic film 202 (e.g., coating 931), or coatings below the electric film 202 (e.g., coating 932). In some embodiments, a scratch or moisture resistant coating may be added above the elastic film 202 (e.g., coating 931) may be added to improve service life. Typically, the coating below the elastic film (e.g., coating 932) may be a resistive or conductive layer that is homogeneous or patterned. In this non-limiting example, raised standoffs 204 are shown as the texture features that may produce pressure sensitive air gaps 210, which control the amount of local membrane area that comes in contact with (or changes its proximity with) an array of electrical conductors in the readout grid 900 as a function of applied local pressure. In regions of low pressure 104, the raised standoffs 204 may produce air gaps 210 that separate electrically active layers of the pressure sensitive membrane 110 from the readout grid 900. At coordinates with less contact and wider air gaps 908, the electrodes of the readout grid 900 may measure low capacitance 918 and/or low conductance 928. In regions of higher local pressure 906, the pressure sensitive membrane 110 may deflect towards the readout grid 900, and exhibit regions with more contact 906 and/or reduced thickness of the air gap 210 between the pressure sensitive membrane 110 and the readout grid 900. At coordinates with more contact and less air gaps 906, the electrodes of the readout grid 900 may measure high capacitance 916 and/or high conductance 926. Smaller air gap 210 thicknesses, t, may generate higher measured capacitance, C, between electrodes 944a and 944b at those coordinates, according to the equation: $C=K*A/t$, where A is the electrode area, and K is the dielectric constant of the insulator. Likewise, higher applied pressure 106 (e.g., at a ridge 106 of the object 102) may increase the contact area (e.g., more contact 906) of the pressure sensitive membrane 110 with the readout grid 900. Therefore, there may be lower resistance, R, between appropriately designed electrodes 944a and 944b at coordinates with higher applied pressure. The readout grid 900 may include a substrate 950 and one or more insulator layers 951. In an embodiment of the readout grid 900, transistors (not shown) may be incorporated into/onto the substrate 950 to provide a biasing circuit for individual sensors to improve the electrical isolation between sensors, as will be described in further detail below.

For interrogation of pressure distributions using a readout grid 900 that may detect local resistance or conductance, the pressure sensitive membrane 110 may be simplified to include a coating below the elastic film 202 (e.g., coating 932), while omitting the coating above the elastic film 202 (e.g., coating 931), and omitting an interface insulator layer 955. The interface insulator layer 955 may include a high dielectric material that may prevent shorting between capacitor electrodes under high pressure such that the coating below the elastic film 202 (e.g., coating 932) will not touch the readout grid 900. Depending on the resistivity of the coating under the elastic film 202 (e.g., coating 932), the contrast of the system may be tuned to have either binary or analog pressure sensitivity. In one embodiment, the coating below the elastic film 202 (e.g., coating 932) may have moderate resistivity, which may produce progressively higher measured local conductance with progressively higher local applied pressure, and which minimizes cross talk with nearby readout electrodes. The resistive or conductive layer under the elastic film 202 (e.g., coating 932) may be a conductive ink, a composite polymer (for example incorporating carbon black particles), a conductive polymer, such as but not limited to polyaniline or poly(3,4-ethylenedioxythiophene):polystyrene sulfonic acid (PEDOT:PSS), a graphene layer, a metal film, and/or other material with controlled resistivity and desirable flexibility. The electrical contact pads for individual sensors may be separated by an insulator layer 951, or by a resistor layer in some configurations of the disclosure. The raised standoffs 204 may be incorporated into the elastic film 202. Alternatively, the raised standoffs 204 may be patterned into the readout grid 900, which may simplify manufacturing of the pressure sensitive membrane 110 as a smooth film, and automatically aligns the contact regions relative to the readout electrodes 944 (e.g., 944a and 944b).

Figure 10:
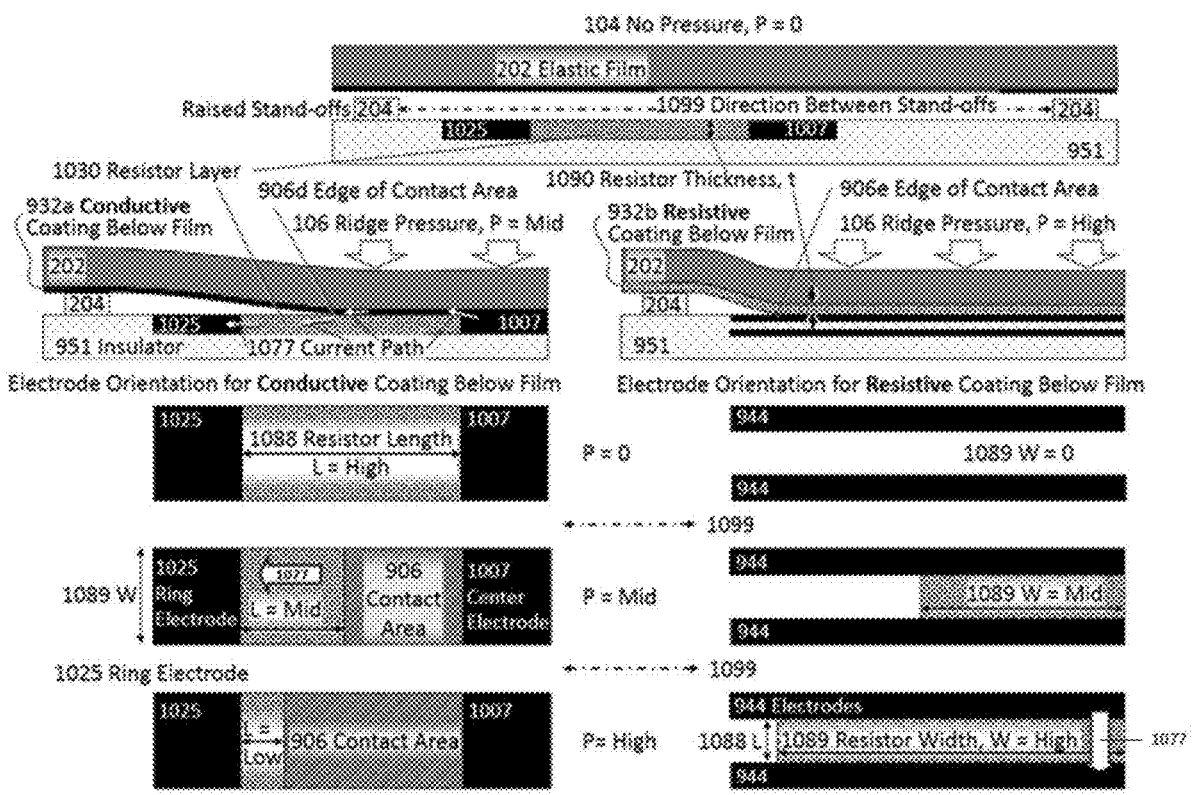
FIG. 10 illustrates a conductive film of a pressure sensitive membrane, in accordance with one or more implementations.

Details of how the pressure sensitive membrane 110 may be interrogated using local resistivity measured by the readout grid 900 may be described with reference to FIG. 10. The combination of the pressure sensitive membrane 110 and the readout grid 900 may create an array of pressure sensitive resistors. Two embodiments are illustrated in FIG. 10. One embodiment may include a conductive coating below the elastic film 202 (e.g., conductive coating 932a), and another with a resistive coating below the elastic film 202 (e.g., resistive coating 932b).

As illustrated in FIG. 10, if a conductive coating 932a is below the elastic film 202, then an effective readout sensor circuit may include a resistor layer 1030 with a ring electrode 1025 and a center electrode 1007. The resistor layer 1030 may be patterned. Where local pressure is absent 104, a relatively high resistance R may be measured between the ring electrode 1025 and the center electrode 1007, according to the formula: $R=\rho*L/(W*t)$, where $\rho$ is the resistivity, L is the resistor length 1088, W is the resistor width 1089, and t is the resistor thickness 1090. Following standard electrical convention, the effective resistor length 1088 may be measured parallel to the direction of current flow 1077 between electrodes, while the resistor width 1089 may be measured perpendicular to the direction of current flow 1077 between electrodes. For optimum pressure sensitivity, it may be convenient to orient the resistor length 1088 parallel to the direction between standoffs 1099 when a conductive coating 932a is applied below the elastic film 202. As progressively more ridge pressure 106 is applied, the conductive coating 932a below the elastic film 202 may first contact the center electrode 1007. The edge of the contact area 906d may then expand over part of the resistor layer 1030. In this configuration under ridge pressure 106, the current path 1077 may be partially shunted through the conductive coating 932a below the elastic film 202, which may continue to reduce the effective resistor length 1088 with increasing applied ridge pressure 106.

As further illustrated in FIG. 10, if a resistive coating 932b is applied below the elastic film 202, functioning pressure sensors may be formed by orienting electrodes 944 so that the effective resistor width 1089 may be parallel to the direction between standoffs 1099. A variable resistor may be formed by the portion of the contact area 906e of the resistive coating 932b below the elastic film 202 that may be between and touching the electrodes 944. As increasing ridge pressure 106 is applied to the elastic film 202, the edge of the contact area 906e of the resistive coating 932b below the elastic film 202 with the electrodes 944 may continue to expand in a manner that gradually increases the resistor width 1089.

Figure 11:
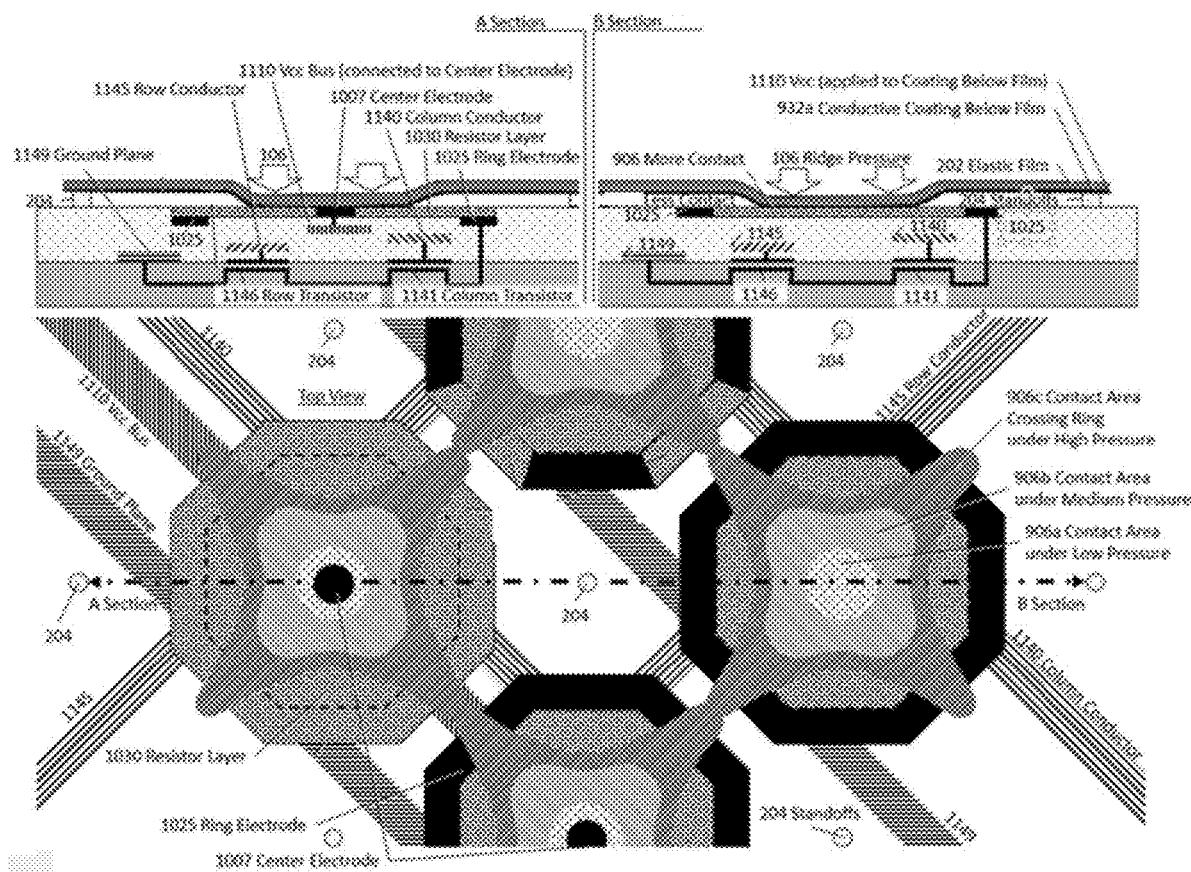
FIG. 11 illustrates a ring electrode design, in accordance with one or more implementations.

FIG. 11 illustrates variations on readout sensor designs including ring electrodes 1025 with and without center electrodes 1007, along with transistors to help isolate sensors from one another. The section view and top view of "A Section" view illustrates the design of a sensor that includes a center electrode 1007. Voltage may be applied through the Vcc Bus 1110, which may be connected to the center electrode 1007. Current flows through the conductive coating 932a below the elastic film 202 and then through the pressure sensitive resistor layer 1030 as described previously in reference to FIG. 9, until it reaches the ring electrode 1025. In order to read one particular sensor, the appropriate row indexing transistor 1146 and column indexing transistor 1141 must both be in the conductive "ON" state as controlled by applying the appropriate bias to both the selected row conductor 1145 and the selected column conductor 1140. Only then will the output voltage from the pressure sensor go through the "ON" transistors to be read after it is collected by the ground plane 1149.

The "B Section" view of FIG. 11 illustrates a special case where voltage may be applied from the Vcc Bus 1110 directly to the conductive coating 932a below the elastic film 202. In this case, there is no need for a center electrode 1007. As described above, when the indexing transistors 1146 and 1141 are both "ON", the pressure dependent voltage across the resistor layer 1030 is read after it is collected by the ground plane 1149.

As illustrated in the bottom half of FIG. 11, if standoffs 204 are placed in a square array, pressure sensitive membrane 110 contact may first occur in the center of the diagonals between standoffs 204, which is therefore a convenient location for the center electrode 1007. Octagonal ring electrodes 1025 are shown as a non-limiting example, as other related electrode configurations may be used, including but not limited to ring electrodes that may be round, square, polygonal, and/or parallel electrodes that are straight, bent, curved, and/or exhibit fractal geometries. When ridge pressure 106 is applied, the contact area 906a under low pressure is roughly circular. The contact area 906b under medium pressure may expand more towards the midpoint between nearest neighbor standoffs 204. At some threshold high pressure, the contact area 906c may cross the ring electrode 1025. If a conductive layer 932a is below the elastic film 202, this threshold high pressure may cause a direct short between the ring electrode 1025 and the center electrode 1007, and additional pressure may not cause further changes to the measured resistivity. However, if the ring electrodes 1025 are covered by the resistor layer 1030, there may not be a direct short, and additional applied ridge pressure 106 may translate into progressively lower measured resistance as long as the contact area 906c continues to expand towards the ring electrode 1025 in other regions of the sensor. This pressure sensitive resistance information may then be expressed as a grayscale image in the present disclosure.

Using an array of transistors so that the readout parameter (i.e. resistance, capacitance, etc.) is only sensitive to the pressure on one sensor at a time may minimize crosstalk between sensors.

Figure 12:
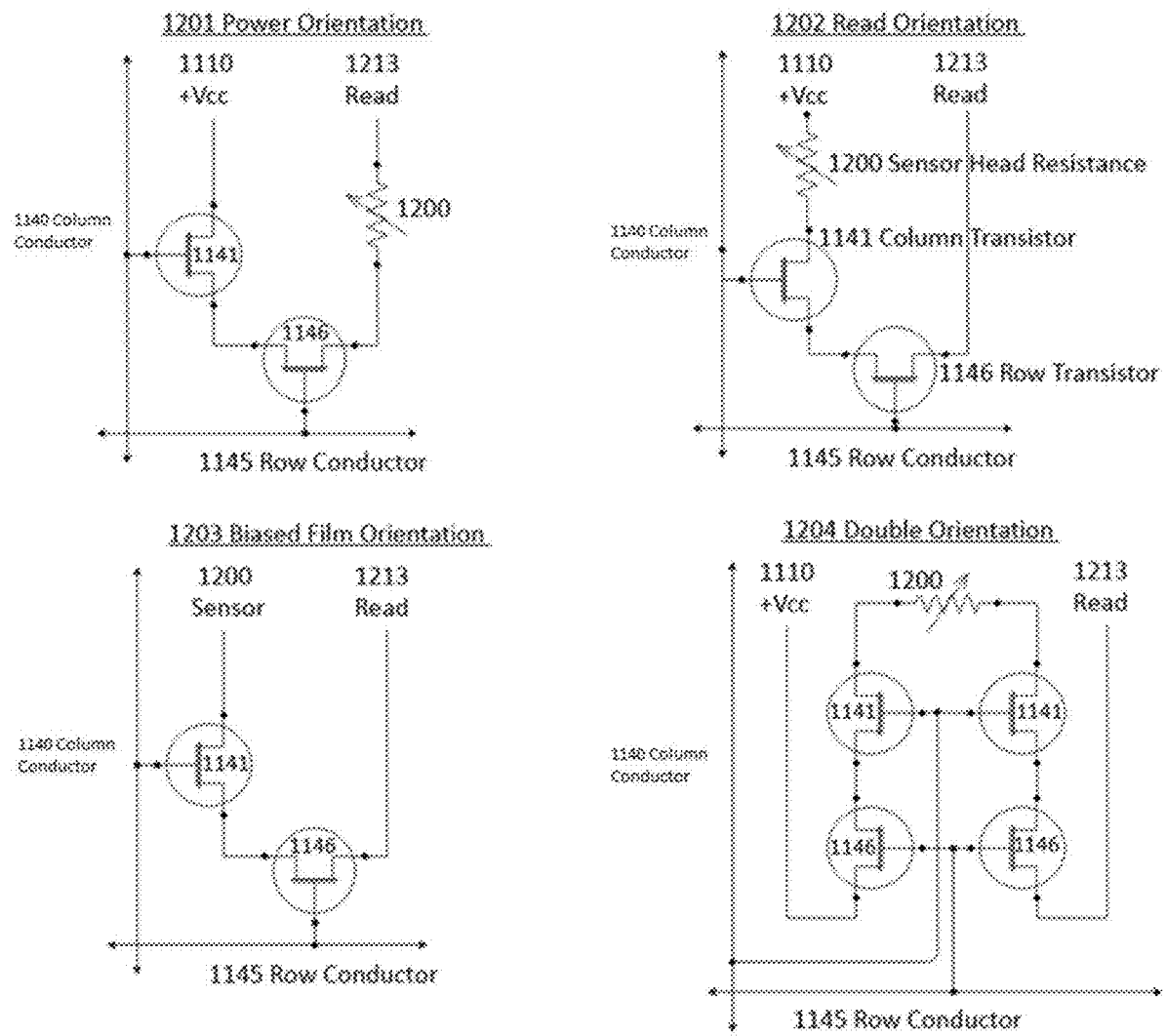
FIG. 12 illustrates read-out transistor orientations, in accordance with one or more implementations.

FIG. 12 illustrates the four preferred potential transistor arrangements inside a particular sensor coordinate within the entire micro matrix pressure sensor array. These include Power, Read, Biased Film, and Double Orientation. In general, the measurement bias of +Vcc 1110 may be applied at one point in the sensor circuit, which contains a pressure sensor head variable resistor 1200, indexing transistors, and a read node, all in series. The specified column conductor/s 1140 and row conductor/s 1145 may apply an indexing bias (of either logic high or logic low value) to the gates of their respective n-type MOSFET column transistor/s 1141 and row transistor/s 1146. If all indexing transistors within a sensor have a logic high bias, then the transistors are conductive, and only then can the pressure measurement signal be detected by the read node 1213.

In the power orientation 1201 illustrated in FIG. 12, the indexing transistors 1141 and 1146 are directly connected to the measurement bias +Vcc 1110, so that only selected electrodes are intended to be biased. The sensor head resistance 1200 may always be connected to the read node 1213, which is essentially reading the sum of the voltage contributions from all sensors. The voltage across the indexed sensor should dominate the read signal 1213. The power orientation 1201 of transistors may work with either a conductive layer 932a or resistive layer 932b below the elastic film 202. The power orientation 1201 works well when there are no subdivisions in the sensor matrix. However, for large sensor matrix arrays, it is sometimes convenient to subdivide the matrix into smaller subdivisions that can all be accessed in parallel. The power orientation 1201 may generate stray signals with matrix subdivisions, because some measurement bias +Vcc 1110 may leak from selectively biased sensors in one subdivision over to unselected but neighboring sensors (with applied ridge pressure 106) in other subdivisions. Such stray signals are more likely when there is a conductive layer 932a below the elastic film 202.

In the read orientation 1202, the indexing transistors 1141 and 1146 may be connected directly to the read node 1213, so only selected sensors are read. The sensor head resistance 1200 of all sensors may be connected to the measurement bias +Vcc 1110, as shown in FIG. 12. The read orientation 1202 may be used with a resistive layer 932b below the elastic film 202. If there is a conductive coating 932a below the elastic film 202, the measured voltage across one sensor head 1200 may be unintentionally distributed to several nearby sensor heads 1200 via the conductive coating 932a below the elastic film 202. This potential source of cross-talk may be reduced if the measurement bias +Vcc 1110 is specifically applied to a center electrode 1007, because then the surrounding ring electrode 1025 may help block the propagation of the measurement bias +Vcc 1110. Cross-talk may be minimized if there is a highly resistive coating 932b below the elastic film 202, which may reduce the parasitic bias as it travels some distance to neighboring sensors. The read orientation 1202 may allow for matrix subdivision, because the +Vcc 1110 may always be applied to one electrode 944 of all sensors across all subdivisions. Therefore, any parasitic bias that leaks over from sensors in neighboring subdivisions is constant, regardless of which sensor is being read.

In the biased film orientation 1203 illustrated in FIG. 12, the measurement bias +Vcc 1110 may be applied directly to the conductive layer 932a under the elastic film 202, which may act as a common electrode for all sensors. Orientation may not be used with a resistive coating 932b below the elastic film 202. Assuming the measurement bias +Vccc 1110 is applied from the perimeter of the pressure sensitive membrane 110, the residual bias would become negligibly small after propagating relatively long distances through the resistive coating 932b below elastic film 202 to sensors closer to the center of the pressure sensitive membrane 110. In this orientation, the conductive coating 932b below the elastic film 202 may act like the center electrode 1007 when it contacts the resistor layer 1030 under applied ridge pressure 106, as shown in the "B Section" view of FIG. 11. Therefore, individual sensor heads only require a single electrode 944 and no +Vcc bus lines 1110 to each sensor, which may reduce sensor complexity and production cost. This biased film orientation 1203 allows for subdivisions, because all sensors have one biased electrode at all times. It does not matter if some bias leaks over to neighboring sensors in other subdivisions. Single electrode sensor head designs are more reliable, because their response is not dependent upon exact initial contact with the center electrode 1007. The biased film orientation 1203 may be a preferred embodiment of the orientations with one pair of indexing transistors.

In the double orientation 1204 illustrated in FIG. 12, the sensor head resistance 1200 is separated from the measurement bias +Vcc 1110 by one set of indexing transistors, and the sensor head resistance 1200 is separated from the read node 1213 by a second set of indexing transistors. This feature gives the double orientation 1204 the most reliable signal values and robust protection against cross talk, because it only powers and reads from the active sensor, and is redundant to prevent misreads and accidental sensor powering. Regardless of whether a conductive coating 932a or a resistive coating 932b below the elastic film 202 is used, the double transistor orientation 1204 will work with all sensor heads 1200 and electrode designs, except the single electrodes designed for the biased film orientation 1203. The disadvantages of the double orientation 1204 may include higher sensor complexity (leading to higher fabrication cost), and higher power consumption (leading to higher dissipation), because there are twice as many transistors per sensor.

For the use of a conductive coating 932a below the elastic film 202, the double orientation 1204 and the biased film orientation 1203 may be the most promising transistor orientations, with the other two orientations being considered only under specific sensor head designs.

For the use of a resistive coating 932b below the elastic film 202, the double orientation 1204 and the read orientation 1202 are recommended. With a resistive coating 932b below the elastic film 202, a biased film orientation 1203 becomes unfeasible, unless each standoff is biased, because it would add a large resistance in the critical measurement path of most sensors.

Figure 13:
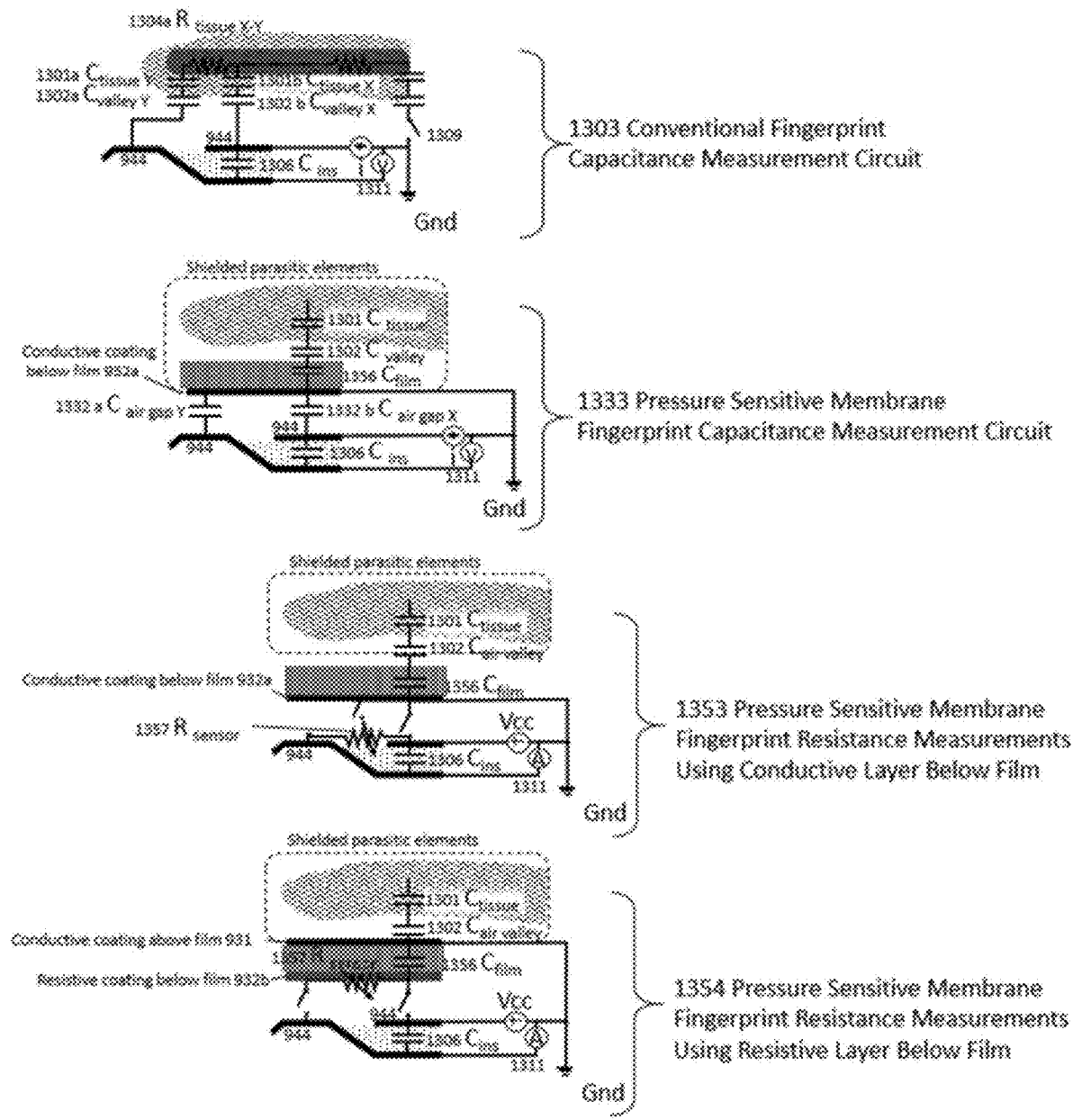
FIG. 13 illustrates equivalent circuits in electrically active pressure sensitive membranes, in accordance with one or more implementations.

FIG. 13 illustrates various parasitic measurement contributions that may be encountered when characterizing fingerprints electronically. Sections 1353 and/or 1354 show equivalent circuits for making fingerprint resistance measurements using either a conductive lay 932a or resistive layer 932b (respectively) below the elastic film 202 of a pressure sensitive membrane 110. Essentially, supporting electrical circuits 1311 measure the resistance of a variable resistor $R_{sensor}$ 1357 that decreases resistance with applied local pressure after the coating 932a or 932b below the elastic film 202 contacts the sensor electrodes 944. Section 1333 shows the equivalent circuit elements involved when using a pressure sensitive membrane 110 to make fingerprint capacitance measurements. In all equivalent circuits for the four interrogation methods illustrated in FIG. 13, there is a common parasitic capacitance 1306 representing the insulator 951 between electrodes 944. When there is a resistive coating 932b below the elastic film 202, section 1354 illustrates how the parasitic capacitance $C_{film}$ 1356 of the elastic film 202 may affect measurements. The key point here is that when using a pressure sensitive membrane 110 to characterize fingerprints, it is possible to shield off all of the parasitic capacitance elements that are above a conductive coating 932a, whether it is applied above or below the elastic film 202.

Fingerprints may be characterized by an array of capacitance measurements. FIG. 13 shows equivalent circuits of conventional capacitance based characterization methods in section 1303 compared to the equivalent circuits used to characterize pressure distributions via a pressure sensitive membrane 110 using capacitance measurements in section 1333.

As shown in section 1303 of FIG. 13, the conventional fingerprint capacitance measurement equivalent circuit 1303 contains a measurement path from one electrode 944 to the other electrode 944 that must pass through the capacitance of air in a finger valley 1302b, then through the capacitance of skin 1301b, then through the resistance of deeper finger tissue 1304a. Then as current leaves the finger again, it passes through another capacitance of skin 1301a and another capacitance of air in a finger valley 1302a. The signal-to-noise ratio of this approach may be compromised by two challenges. A low signal results from the low capacitance that is caused by a skin layer that is approximately 1 mm thick and the low capacitance caused by variations in air thickness from 0 to 0.1 mm under a fingerprint ridge or valley, respectively. A high noise level is caused by significant variations in the conductivity and dielectric constant of human tissue. Furthermore, the resolution of conventional capacitance based fingerprint characterization methods is compromised because the current may interact with approximately 1 mm of skin, even if the electrode spacing is only about 0.05 mm. Noise from variability in tissue electrical properties may become larger if the current passes through a large portion of the finger before reaching a large common ground electrode. This option is represented by closing the ground switch 1309.

In FIG. 13, the equivalent circuit for pressure sensitive membrane based capacitance measurements of a pressure distribution 1333 shows why the current disclosure increases the signal-to-noise ratio dramatically. The highly conductive layer below the parylene film may be grounded to effectively block any parasitic capacitance contributions from interaction with human tissue 1301 or air in fingerprint valleys 1302. Therefore, the main capacitive elements that are measured by current passing from one electrode to the other are the capacitances 1332a and 1332b of the air gap under the elastic membrane. By shielding out the constant capacitance of the elastic film 1356, the measured net capacitance may become more sensitive to the thickness of the air gap between raised standoffs. Noise may be reduced without the variability in the electrical properties of human tissue. Fine resolution may be maintained because the top electrodes of the measured capacitors may mirror the small electrode dimensions. Signal strength is high because the measured capacitance is large from the narrow air gap thickness from 0 to 0.3 μm, under a ridge or valley respectively.

Figure 14:
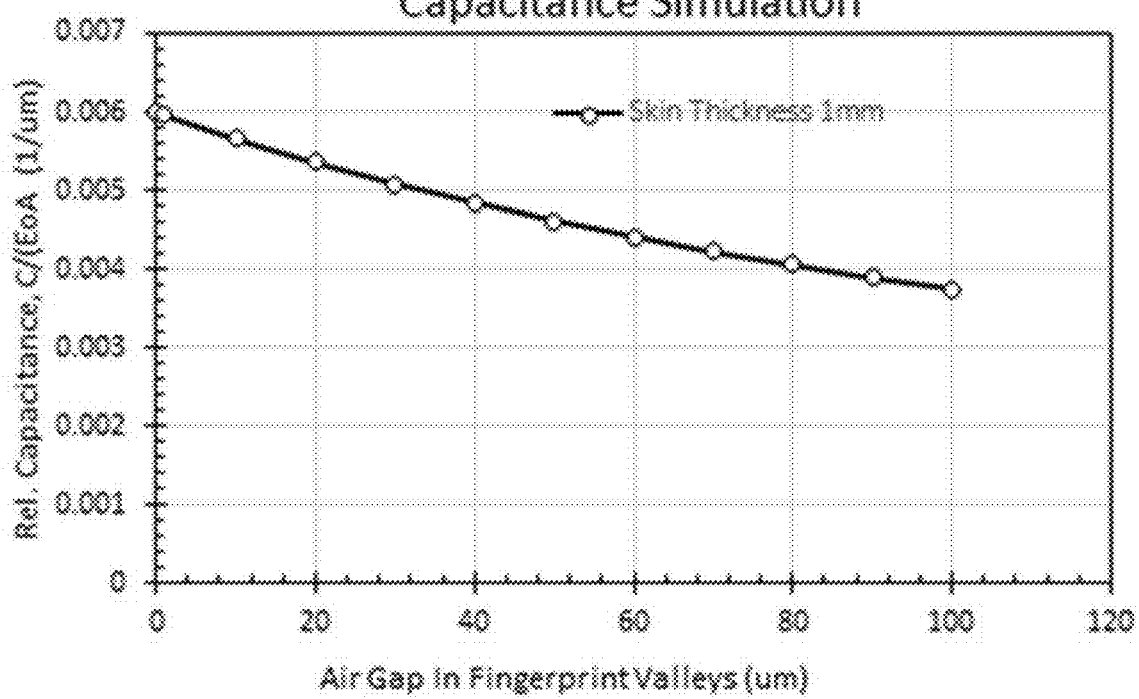
FIG. 14 illustrates simulated pressure sensitive capacitance measurements using a pressure sensitive membrane, in accordance with one or more implementations.
Figure 14:
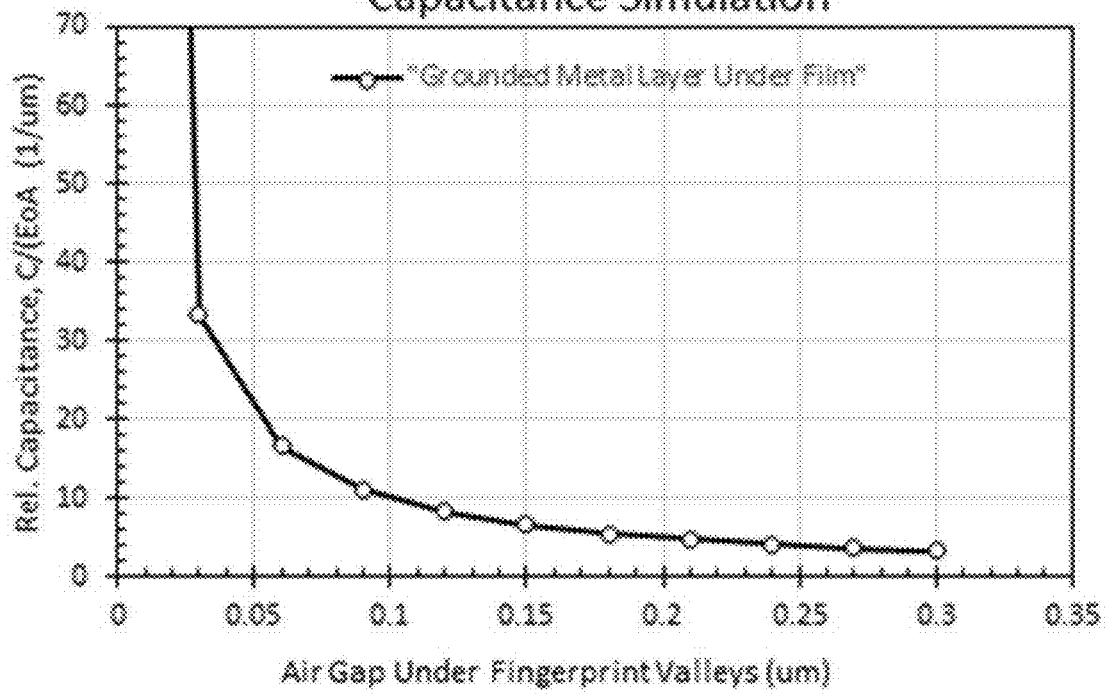

FIG. 14 illustrates a comparison of the expected range of simulated capacitance measurements from a human fingerprint ridge to valley for both a conventional capacitance approach 1401 and the present disclosure of a pressure sensitive membrane capacitance approach 1402. As shown in the simulation results displayed in FIG. 14, the pressure sensitive membrane approach produces capacitance signals that are about 5 orders of magnitude higher than the capacitance signals from a conventional direct characterization of human tissue.

In an embodiment, it may be possible to read pressure sensitive resistance sensors without the use of indexing transistors 1141 and 1146. This may require directly connecting the column conductors 1141 with the positive electrodes 944 and directly connecting the row conductors 1146 with the negative electrodes 944, or vice versa. However, when a large local region is in contact with the readout grid due to high local pressure, there may be cross talk between pressure sensors. The possible paths between the sensor electrodes 944 through the coating 932 below the elastic film 202 and nearby sensor row and column conductors may generate an even lower measured resistance at the selected junction than if only a small local resistive region was in contact with the sensor electrodes. In moderation, this context amplified signal effect is a beneficial artifact of estimating local pressure based on local resistance measurements (the reciprocal of local conductance measurements). The thickness and resistivity of the resistive coating 932b below the elastic film 202 may be tailored to control the measured resistance and thereby to optimize system performance. Increasing resistance may increase sensitivity to pressure, assuming resistance is measured by recording the voltage induced by an applied current pulse. Increasing resistance may reduce the effective distance over which the context amplified signal effect occurs, thus reducing coordinate cross-talk and producing finer spatial resolution. In this way, the local pressure may be interpreted from the local resistance, and this interpreted pressure may be represented as a grayscale value in the generated pressure image. Alternatively, a much higher contrast image may be generated by replacing the resistive layer 932b with a highly conductive layer 932a, such as a thin metal coating. Direct contact completion of a circuit by a conductive layer may produce a black and white image representing local pressure values that are above or below a pressure threshold, which may be determined by the mechanical properties of the pressure sensitive membrane 110. A drawback of using a highly conductive lower contact layer 932a in the pressure sensitive membrane 110 without indexing row transistors 1146 and column transistors 1141 is that there may be significant cross-talk between sensors, because there can be multiple conductive paths from one coordinate to another if those contact pads have been effectively shorted by contact with the pressure sensitive membrane 110 in other locations.

Figure 15:
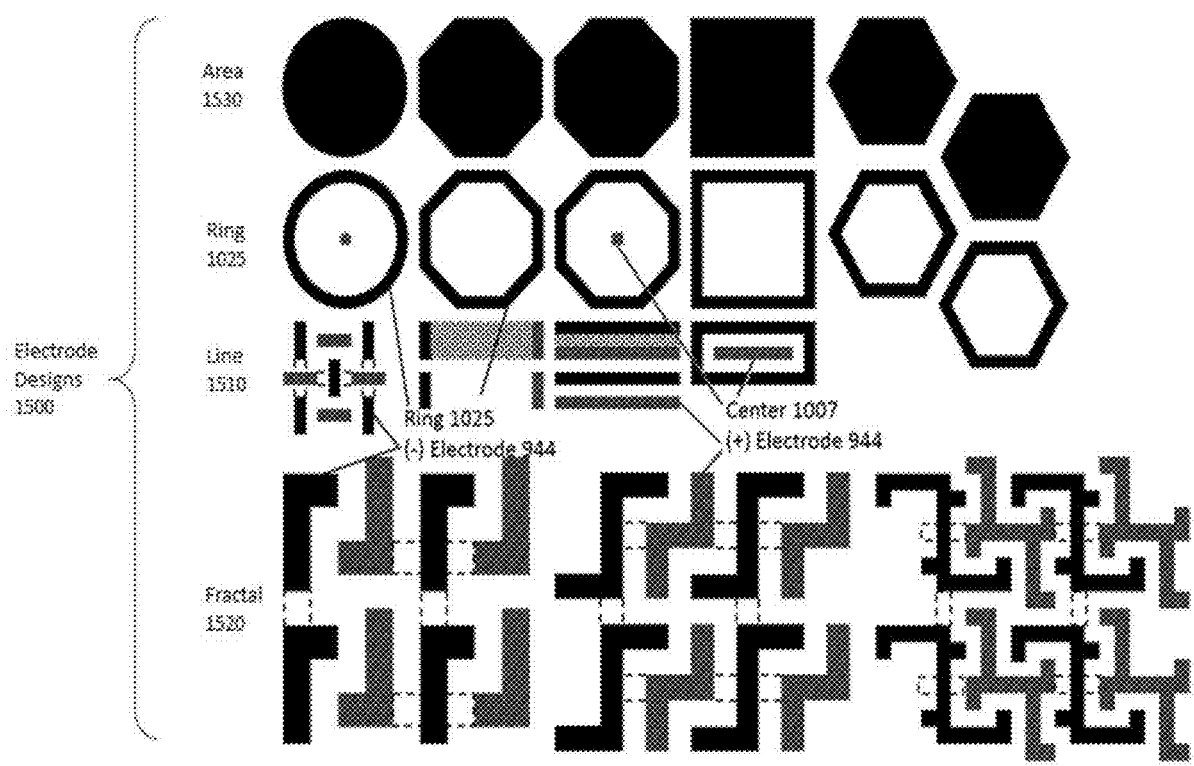
FIG. 15 illustrates various electrode designs, in accordance with one or more implementations.

A wide variety of non-limiting example electrode designs are shown in FIG. 15. Key features and functions of these electrodes 944 may be independent of whether the electrodes are connected directly or indirectly (through indexing column transistors 1141 and row transistors 1146) to column conductors 1140 or row conductors 1145. In FIG. 15, the positive and negative electrodes 944 are illustrated in two different shades and each electrode within a sensor is shown as a discrete electrically isolated region, as would be the case when used with indexing transistors. Dashed lines show how similar polarity electrodes 944 could be connected, as would be the case when directly connected to either column conductors 1140 or row conductors 1145. In either case, it is generally desirable that the electrodes 944 all terminate at the same coplanar top surface, for consistent electrical contact interaction with the coating 932 below the elastic film 202.

The simplest electrodes are the line electrodes 1510, the behavior of which has been described previously relative to FIG. 10. When using a resistive coating 932*b* below the elastic film 202, one way to increase the fraction of the imaging surface 120 that participates in the pressure sensitive response of a sensor is to arrange the electrodes 944 into many regions where the electrodes 944 are locally parallel to each other. If there is no registration between the standoffs 204 and the electrodes 944, then fractal electrodes 1520, such as those shown in FIG. 15, effectively distribute the interaction between electrodes 944 across the imaging surface 120.

The ring electrodes 1025 shown in FIG. 15 are particularly well suited for situations where there is careful registration or alignment between the position of the standoffs 204 and the electrodes 944. For example, such alignment may be built-in by fabricating the standoffs 204 as part of the electrical readout grid 900, instead of fabricating the standoffs 204 as part of the pressure sensitive membrane 110. Ring electrodes 1025 may be formed using any polygonal approximation of a circle around a central electrode 1007 of any shape. Details of the design and behavior of ring electrodes have been discussed relative to FIG. 11. Although any of the electrode designs 1500 illustrated in FIG. 15 may be used to make either resistive or capacitive pressure sensitive measurements, the filled in area electrodes 1530 are particularly suited for making capacitive pressure sensitive measurements, because the high surface area of electrodes 1530 provide a larger capacitance signal. The readout grid electrode geometries shown in FIG. 15 illustrate the variety of electrode patterns that may be used to electrically interrogate the pressure sensitive membrane. This is not meant to be a limitation of this disclosure, as other readout grid electrode patterns may be used.

Figure 16:
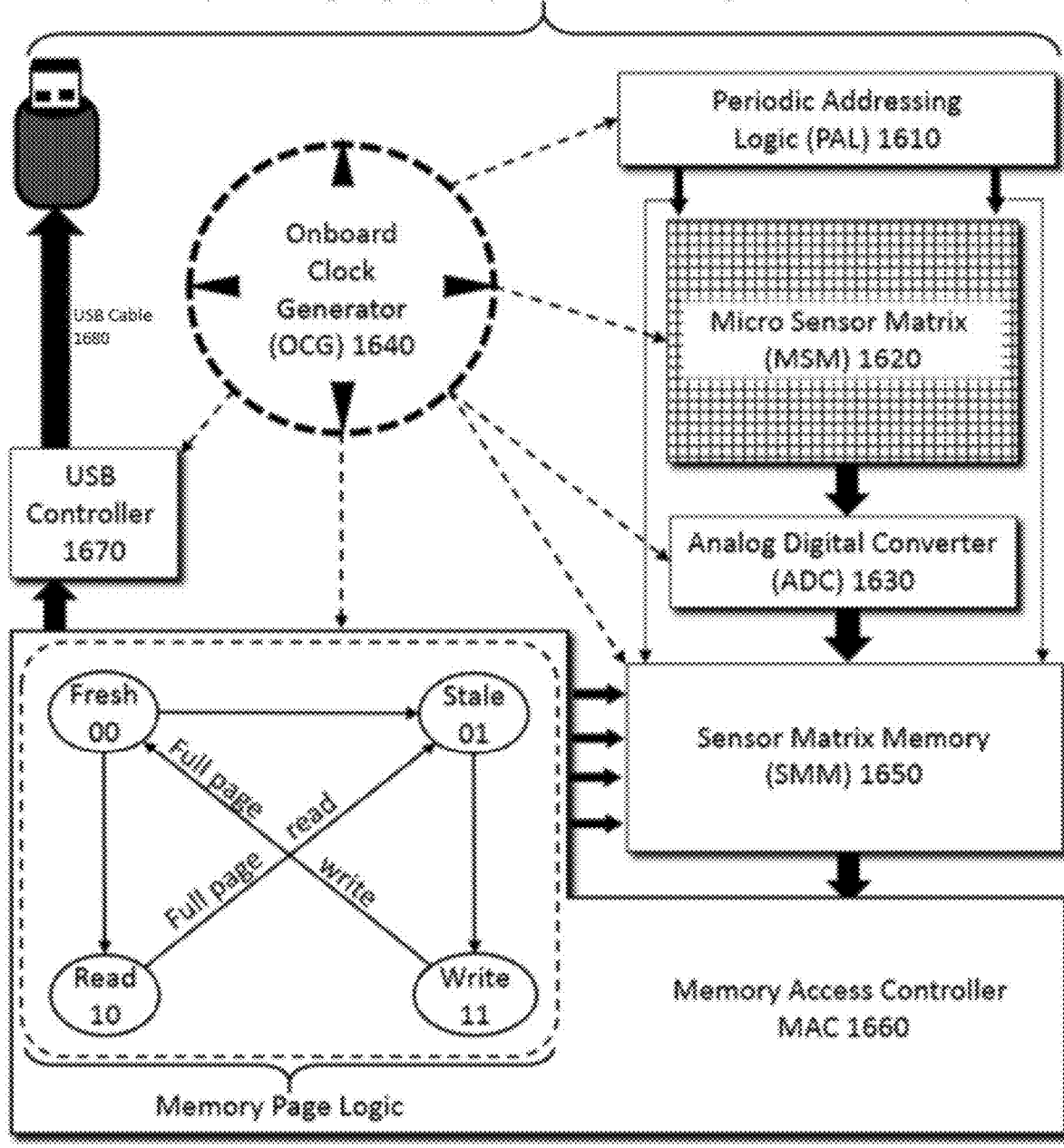
FIG. 16 illustrates a flowchart for processing electrical pressure sensor data, in accordance with one or more implementations.

Referring to FIG. 16, a fingerprint image, representing the pressure distribution applied to the imaging surface, may be formed by collecting individual pressure measurements (described above) from an array of pressure sensors, referred to as the micro sensor matrix (MSM) 1620, and placing this data into a sequential series of values representing local pressure data, which may then be reassembled into an image of the fingerprint. FIG. 16 illustrates a flowchart 1600 of one possible sensor indexing circuit to accomplish this task. This is not meant to be a limitation of this disclosure, as other variations of this indexing approach are possible. Regardless of which indexing transistor orientation is used (see FIG. 12), bias may be applied to the gate of an n-type MOSFET transistor from either the column conductor 1140 or row conductor 1145 addressing lines. These lines carry either logic high or logic low values, and are powered from an on-chip periodic addressing logic (PAL) 1610. The PAL 1610 may sequentially select different sensors in the MSM 1620 using only a clock signal and a power source. The MSM 1620 may be divided into $K^2$ total subdivisions, where K is the number of subdivisions along one side. The read node 1213 of individual sensors within a subdivision may be connected to a common output read line. The value of the electrical output parameter (whether current or voltage) of individual subdivisions at a particular addressed location may be passed to the analog-to-digital converter (ADC) 1630, where it may be converted from an analog measurement into a digital value. Other digital value resolutions may be possible. The digital value may then be sent into a sensor matrix memory (SMM) 1650, where a memory access controller (MAC) 1660 may determine which page (section of data), out of L possible stored pages, will receive the new data. When N×M bytes have been written to memory, the SMM 1650 may communicate to the MAC 1660 that the page is full. The MAC 1660 may select the next page in the sequence to receive new data, skipping over a page that is being read. The MAC 1660 may communicate with the USB controller 1670. The MAC 1160 may read data from the SMM 1650 to be sent over the USB wire 1680 to the host computer or other device. Using the Page Status flags from the SMM 1650, the MAC 1660 may select the most recent full page of memory. Using addressing logic similar to that in the PAL 1610, the MAC 1660 may then read individual values within a page memory and transmit it to the USB controller 1670, which prepares it for communication over the USB output wire 1680.

The PAL 1610 may operate off of the onboard clock generator (OCG) 1640 and the power received from the USB connection 1680. After initialization, PAL 1610 may advance its row select state using a shift register every clock cycle. When the row shift register "rolls over" (i.e. completes one full cycle of shifts in the position of the logic high output value across all of the rows within a subdivision), this may trigger the column shift register to advance. The column shift register's final state may roll over to its initial state. This cycle may repeat endlessly, and operates in synchronicity with the SMM 1650, to correctly store the sensor data packets into the correct memory locations. Optionally, the PAL 1610 may occasionally reset the SMM 1650 to keep it in sync with the MSM 1620 indexing. There may be N/K row select states, and M/K column select states, where K is the number of subdivisions per row. The select states may be encoded using "one-hot" encoding, in which the $i_{th}$ one of a set of N/K logic transistors may represent the row state within a subdivision, and the $j_{th}$ one of a set of M/K logic transistors may represent the column state within a subdivision. These two states may determine which (i,k) coordinate within each of the $K^2$ subdivisions of the MSM 1620 is to be read (i.e. which sensor from each of the $K^2$ subdivisions) into one packet of data.

The MSM 1620 may include an N×M array of pressure sensors (described previously). Little logic may be within the MSM 1620, except for the indexing transistors 1141 and 1146 inside individual sensors. The MSM 1620 may receive the one-hot encoded column (i) and row (j) states from the PAL 1610 as sequentially connected combinations of column conductors 1140 and row conductors 1145. As described previously relative to FIG. 12, when the column conductor 1140 and the row conductor 1145 apply logic high values to the column transistor 1141 and row transistor 1146, respectively, of a given sensor, then the output signal from that particular (i,j) sensor may be actively connected to its read node. The read nodes of all sensors within the same subdivision may all be connected together to the read bus of that subdivision. Within a given packet, it may be convenient to gather signal values from sensors that all have the same (i,j) coordinate relative to the lower left corner of each subdivision. The combined connections of the PAL 1610 and the MSM 1620 may be designed to output one signal at a time from each subdivision.

The ADC 1630 may first take in the analog values from the MSM 1620. Individual subdivisions in the MSM 1620 may have a separate read bus that may be physically connected to its own ADC 1630. Here individual analog read values are buffered and then converted into a digital value. These ADCs 1630 may be implemented using flash technology, but successive approximation register (SAR) may be an option. The digital sensor data is then passed to the SMM 1650 in sync with the present indexing coordinates that came from the PAL 1610.

The SMM 1650 may store the present packet of data into the current page of memory. The SMM 1650 may be an array of registers (typically 8 bit, but other levels of data precision may be used) that may hold L packets of matrix reads from the MSM 1620. The SMM 1650 may consist of N×M pages. The SMM 1650 may operate in sync with the PAL 1610, and as such, the SMM 1650 write locations in the active page may be deterministic based upon clock pulses. In the event that the SMM 1650 becomes out of sync with the PAL 1610, it may be possible for the write position to be reset back to the top of the current page when the PAL 1610 shift registers rolls over. In this event, no meaningful data will be lost because a desync would corrupt the page of data, so immediately re-writing is inconsequential. When a page is finished being written, the SMM 1650 may communicate to the MAC 1660 to update its "dirty page table". The benefit of storing an array of the past reads from the MSM 1620 onto the SMM 1650 device is that this allows the MSM 1620 to scan a full page as fast as possible, without concern for any bottleneck of transferring the data back to its host. While not every scan may be transmitted to the host using this method, this approach insures that scans represent values of the sensors taken within the smallest possible time interval.

The MAC 1660 may accept requests for data from the USB controller 1670, and may query the SMM 1650 for the relevant data. The MAC 1660 may manage which page is the next page to be written, using what is called a "dirty page table". The MAC 1660 may make these decisions based on its dirty page table flags and page rollover flags received from the SMM 1650. The dirty page table may have the following possible flags (stored as indicated values): "fresh" (e.g., 00), "stale" (e.g., 01), "read" (e.g., 10), and "write" (e.g., 11). The memory page logic chart shows how the flags of one page may move between these values. To define terms, a page is "fresh" if it is the most recently written page and it has not been read, so a "fresh" page is ready to be read. A page is "stale" if it has already been read or is not the most recently written page, so a "stale" page is ready to be written. A page is "read" if it is currently being read, and a page is "write" if it is currently being written. The MAC 1660 may select the next page in sequence that is not being read and is not the most recent page.

The OCG 1640 may generate sequential pulses that drive all sequential logic on the board.

The USB controller 1670 may communicate with the host over USB cable 1680. The USB controller 1670 may act as an intermediary between the circuit and the host. It may read requests sent by the host and may query the MAC 1660 for the necessary data to send back to the host.

Figure 17:
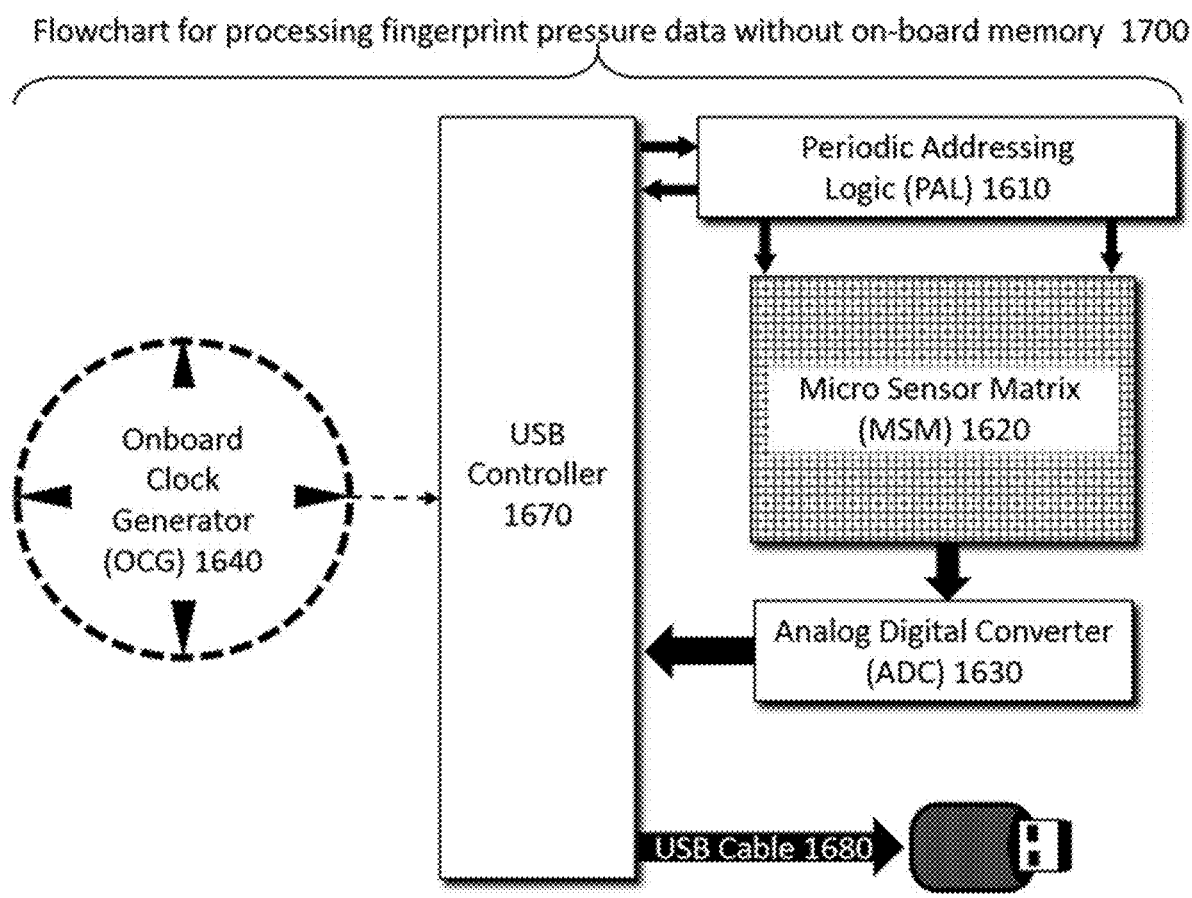
FIG. 17 illustrates a flowchart for processing electrical pressure sensor data, in accordance with one or more implementations.

In some embodiments, it may be convenient to move the onboard memory to locations not on the same integrated circuit as the MSM 1620, or to remove the memory entirely. This approach may be possible if the data transfer speed to the host is acceptably high, in order to benefit from the economics of using off-the-shelf sensor matrix memory chips and/or off-the-shelf memory access controller chips. A flowchart 1700 for such a pared down integrated circuit without the SMM 1650 and MAC 1660 is summarized in FIG. 17. The OCG 1640 in FIG. 17 now distinctly clocks the USB controller 1670, and the USB controller 1670 passes the clock signal to the PAL 1610. This may allow the USB controller 1670 to pause the clock signal and send an end of page signal over the USB cable 1680 to tell the host the page read has been completed. In this orientation, the $K^2$ bytes read from the MSM 1620 may be buffered in the USB controller 1670 before being sent over the USB cable 1680. Thus, the OCG 1640 clock speed may be restricted by the bottleneck of the USB cable 1680. The PAL 1610, the MSM 1620, and/or ADC 1630 functions may be the same as described above. The onboard clock generator OCG 1640 may be internally fabricated to function the same as has been described above, however in this pared down circuit, the OCG 1640 may be connected to the USB controller 1670. In this case, the USB controller 1670 may be primarily responsible for the control of all digital data.

Figure 20:
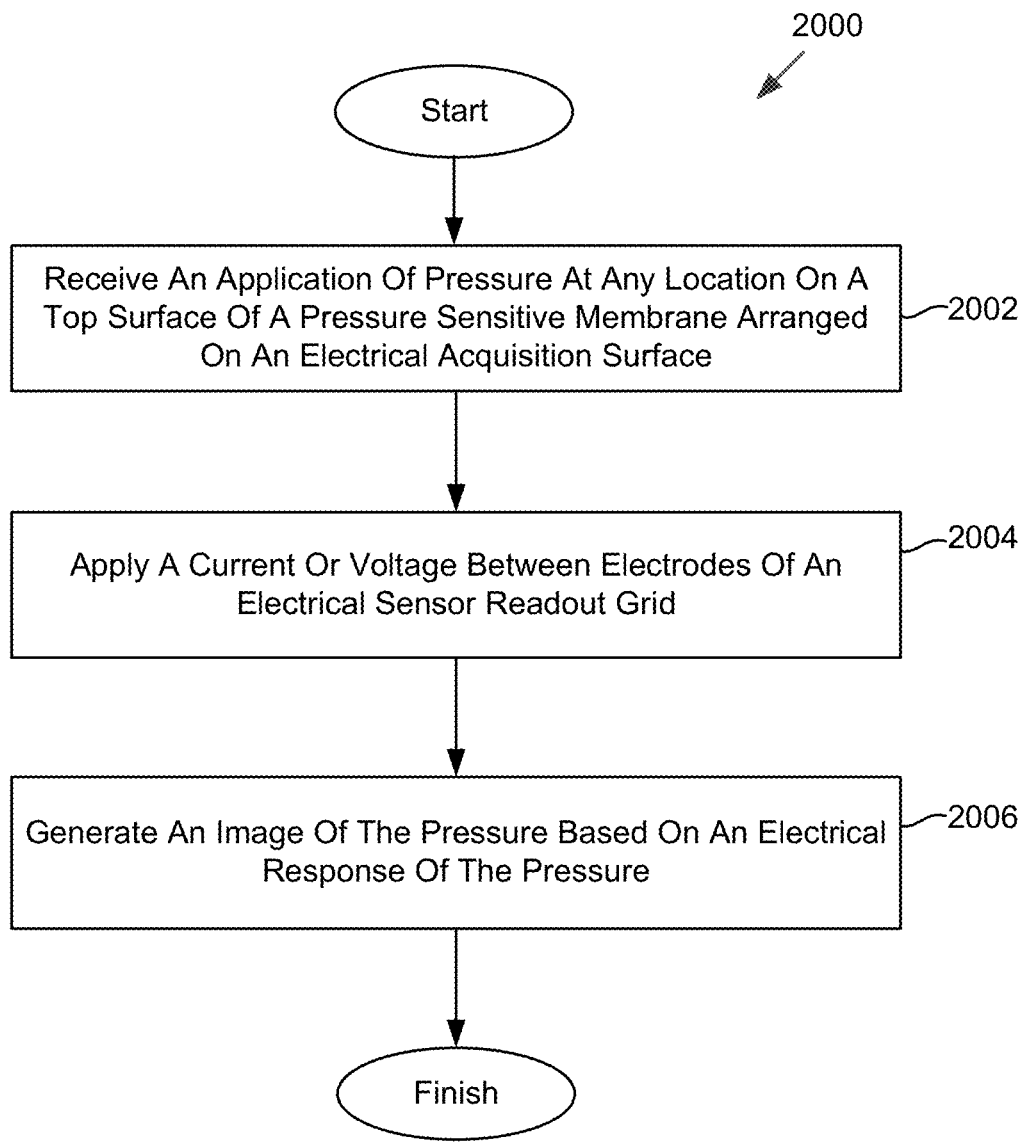
FIG. 20 illustrates a method for capturing an image of an object using an electrical pressure sensor readout grid system, in accordance with one or more implementations.

FIG. 20 illustrates a method 2000 for capturing an image of an object using an electrical pressure sensor readout grid system, in accordance with one or more implementations. The operations of method 2000 presented below are intended to be illustrative. In some implementations, method 2000 may be accomplished with one or more additional operations not described, and/or without one or more of the operations discussed. Additionally, the order in which the operations of method 2000 are illustrated in FIG. 20 and described below is not intended to be limiting.

In some implementations, method 2000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 2000 in response to instructions stored electronically on an electronic storage medium. The one or more processing devices may include one or more devices configured through hardware, firmware, and/or software to be specifically designed for execution of one or more of the operations of method 2000.

At an operation 2002, an application of pressure may be detected at any location on a top surface of a pressure sensitive membrane arranged on an electrical acquisition surface.

At an operation 2004, a current or voltage may be applied between electrodes of an electrical sensor readout grid.

At an operation 2006, an image of the pressure may be generated based on an electrical response to the pressure.

Reduction to Practice

In this example, a controlled texture of a pressure sensitive membrane took the form of raised standoffs cast from holes in a silicon wafer mold. The silicon wafer mold contained a hexagonal close packed array of 2 micron diameter holes, spaced 50 μm apart, and etched to a depth of 280 nm. The etched silicon wafer mold was spin coated with a 2% aqueous solution of micro-90 cleaning solution acting as a release agent. To provide uniform exposure to parylene vapor, this wafer was placed on one of 10 horizontal trays attached to the central rotating feedthrough of a model 2010 Parylene Deposition System, configured in a standard manner with a multi-hole pipe manifold for delivering parylene vapor throughout the chamber. A load of 10 g of Parylene C was placed in the vaporizer. The system was pumped down, then standard parylene deposition temperatures and conditions were set and used, according to instructions from the manufacturers of the system, Specialty Coating Systems. After about 70 minutes of vapor polymerization, a 4 μm thick Parylene C film was deposited onto the silicon wafer mold. To minimize optical interaction with the top surface (i.e. where the object with a pressure distribution would be applied), the absorbance of the parylene film was increased by dying the film black while it was attached to the silicon mold. The film was dyed using a noncontact sublimation dye transfer process, using a T-shirt press. The dyed and textured parylene C film was adhesively bonded to a flexible plastic frame and removed from the silicon wafer mold. The pressure distribution image 1800 in FIG. 18 was obtained using an i3 mini+ fingerprint live scan system after placing the framed pressure sensitive membrane on the imaging surface of the prism prior to applying finger pressure through the pressure sensitive membrane.

Figure 18:
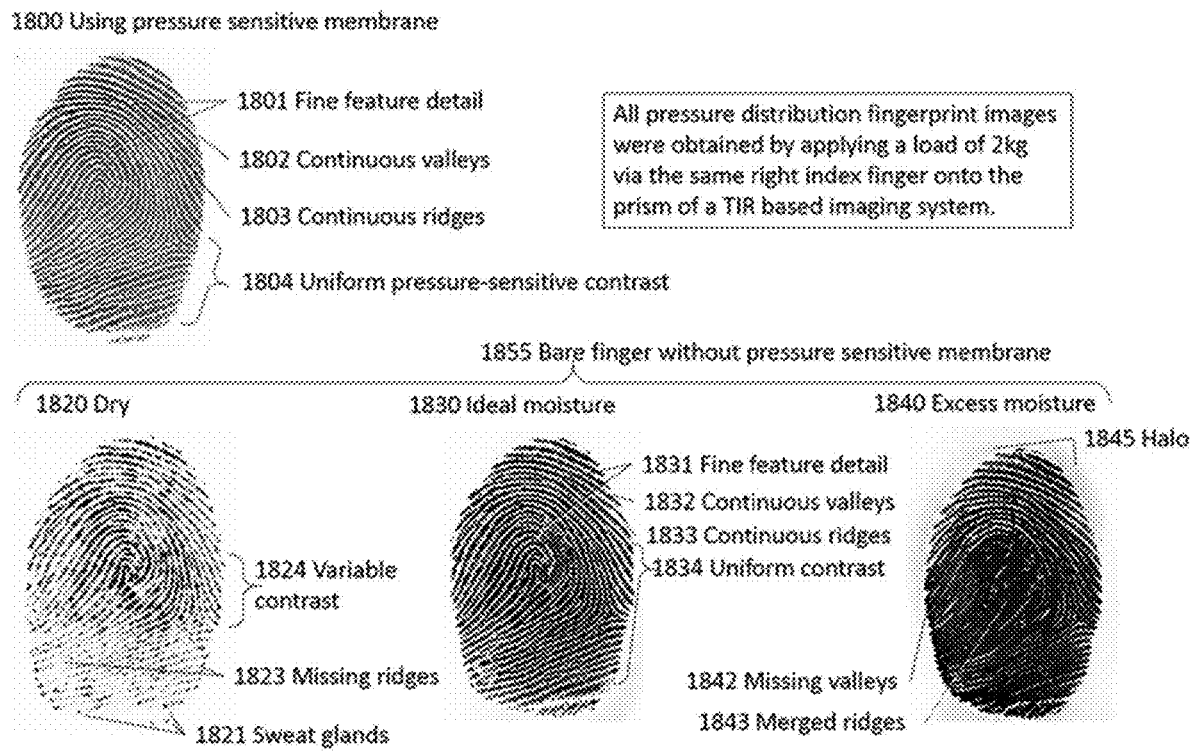
FIG. 18 illustrates a comparison of various fingerprint images, in accordance with one or more implementations.

FIG. 18 compares the quality of fingerprints acquired using the pressure sensitive membrane with images of bare fingerprints 1855 that were acquired without a pressure sensitive membrane. The example fingerprint pressure distribution image 1800 was acquired using the pressure sensitive membrane described above in conjunction with an i3 mini+ total internal reflection (TIR) based imaging system. The pressure distribution image 1800 that was acquired using a pressure sensitive membrane 110 clearly shows very fine feature details 1801 such as a string of island nodes along the terminus of a ridge, and the granular texture within each ridge. The valleys are all continuous 1802 and the fingerprint ridges 1803 are continuous. Across the entire fingerprint there is uniform pressure sensitive contrast 1804 (i.e. the average grayscale value within ridges is consistent across the entire fingerprint), while local variations in grayscale reveal the fine-scale ridge structure without obscuring the large-scale ridge shape structure. Such a high quality image is easily processed into recognizable fingerprint features.

The fingerprint images acquired from a bare finger 1855 without a pressure sensitive membrane may be highly sensitive to local and global moisture content levels. For example, the TIR image of a dry finger 1820 may be marked by highly variable contrast regions 1824. In areas with lower moisture, sections of ridges may be missing 1823, and sweat glands 1821 may mark regions of ridges that are imaged as dark spots. Such dry fingerprints may be difficult to process into recognizable fingerprint features because discontinuities in fingerprint ridges may appear very similar to ridge terminus points. Sweat glands 1821 may be active in some areas on one day and in entirely different areas on another day, which creates additional challenges against obtaining repeatable fingerprints for long-term database matching. Under ideal moisture levels 1830, which may be obtained temporarily for a few seconds by breathing on a finger, the desired qualities of a fingerprint may be obtained by chance, such as fine feature detail 1831, continuous valleys 1832, continuous ridges 1833, and uniform contrast 1834. However, under excess moisture levels 1840, condensation may form halos 1845 around the finger, valleys may be intermittent or completely missing 1842 and merged ridges 1843 may form large dark undefined regions. All pressure distribution fingerprint images in FIG. 18 were obtained by applying the same load of 2 kg via the same right index finger as it was placed onto the prism of the TIR based imaging system.

Optimizing Mechanical Behavior

Figure 19:
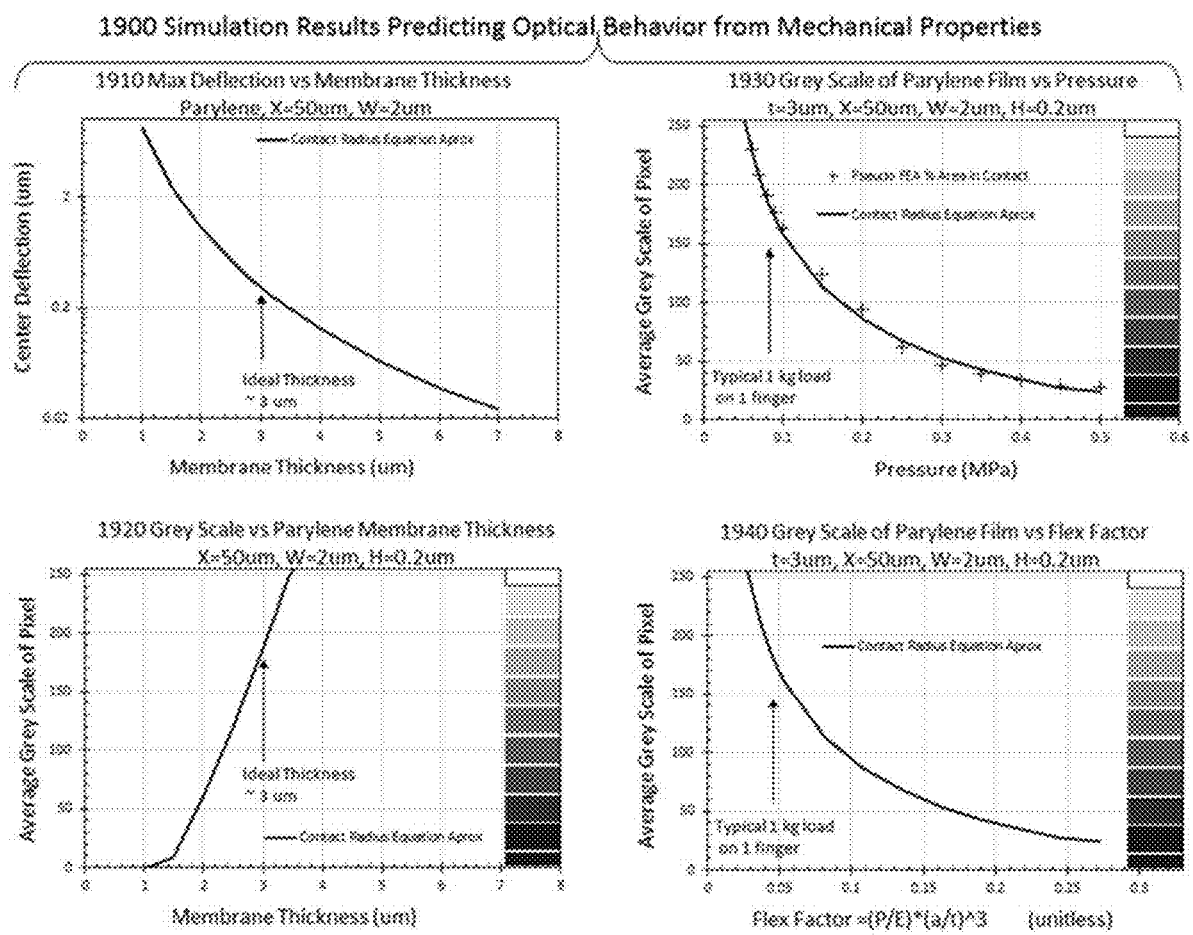
FIG. 19 illustrates a comparison of trends from simulation results that predict optical behavior from mechanical properties, in accordance with one or more implementations.

Using a parylene membrane cast using a Si wafer containing etched pits as a non-limiting example, the following analysis explains how a particular range of geometric and mechanical parameters may be needed to optimize the performance of the pressure sensitive membrane. This analysis may then be generalized to guide the design of pressure sensitive membranes made out of other materials. Adapting the standard equations for the deflection of a membrane, a pseudo-finite element analysis approach was used to calculate the deflection of an elastic film, in this case made of parylene, which was suspended over a set of raised standoffs, in this case arranged in a hexagonal close packed array. In FIG. 4, the deflection between standoffs was previously presented, plotting both the cross-section between nearest neighbor standoffs and the cross-section of the bottom of the film between diagonal standoffs in a hexagonal close packed array under a typical light applied finger load of 1 kg, with a parylene film thickness of 3 μm, a 50 μm spacing between nearest neighbor standoffs that are 2 microns wide, and a standoff height of 0.2 μm. These are the same default reference geometric values that were used in the simulation results presented in FIG. 19. In FIG. 4, the deflection between standoffs 430 may move the film to intimate contact with the imaging surface in specific regions along the diagonal between standoffs, while deflection between nearest neighbor standoffs may not yet reach the full height of the standoffs. The two-dimensional area of intimate contact between the elastic film and the imaging surface effectively interrupts total internal reflection and appears dark, while areas of a pixel without this intimate contact allow total internal reflection and appear light. Using 0 to represent 100% contact and 255 to represent 0% contact, the gray scale of a pixel registered by the camera may be estimated as a linear interpolation of the dark contact area fraction of the pixel area. FIG. 19 displays trends from simulation results that predict optical behavior from mechanical properties 1900. The plot of maximum deflection versus membrane thickness 1910 shows that as membrane thickness increases by just a few μm, the center deflection decreases several orders of magnitude. Notice that the maximum center deflection is just larger than 0.2 μm for a 3 μm thick membrane under a typical light applied finger load of 1 kg. Therefore, if the standoff height is fixed at 0.2 μm, then the film will begin to contact the imaging surface under light finger pressure. As shown in the plot of grayscale versus parylene membrane thickness 1920, under these conditions of light finger load, the gray scale of a pixel will increase almost linearly with membrane thickness from 1.5 μm to 3.5 μm. Since it is desirable that a light finger load generate a light gray grayscale, a good starting point in the design of the elastic membrane is to choose a film thickness of approximately 3 μm. By fixing the film thickness at 3 μm, the plot of the gray scale of a parylene film versus applied pressure local 1930 shows how the pixel gray scale would change from light to dark as the applied finger load changed from 0.06 MPa to 0.5 MPa, representing the typical range of applied local pressure under a finger ridge. Notice that with these geometric design choices, the pressure sensitive membrane produces the desired light gray pixels under each ridge at a typical low 1 kg finger load across the typical area of 2 cm$^2$. By re-plotting this same curve as the grayscale of a parylene film versus flex factor 1940, and only changing the X axis from pressure to the corresponding flex factor for individual pressures, it is possible to visualize the sensitivity of the pixel response to various film parameters. In this case, the flex factor is defined as $(P/E)*(a/t)^3$, where P is the applied pressure in MPa, E is the elastic modulus in MPa, "a" is half the nearest distance between standoffs in μm, and t is the film thickness in μm. Notice that the flex factor is only linearly sensitive to the ratio of P over E, but the flex factor is proportional to the cube of "a" over "t", predicting that optical response is extremely sensitive to membrane geometry. This plot of grayscale versus flex factor 1940 acts as a master curve, because one can calculate the flex factor for any combination of geometry, material, and applied pressure to predict the optical response of that pressure sensitive membrane when characterized in a total internal reflection based acquisition system.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A pressure sensitive membrane including:
    an elastic deformable film having a top surface and a bottom surface opposite the top surface, wherein the elastic deformable film has less than a 20 µm thickness; and
    a textured portion that is formed such that in a default position, an air gap exists between the pressure sensitive membrane and an imaging surface on which the pressure sensitive membrane is arranged, and wherein responsive to a finger applying pressure on the top surface of the pressure sensitive membrane, the pressure sensitive membrane is collapsed into a collapsed position and the air gap is diminished,
    wherein a pattern corresponding to friction ridges of the finger is formed by engagement between the pressure sensitive membrane in the collapsed position and the imaging surface responsive to the finger applying pressure on the top surface of the pressure sensitive membrane, and wherein responsive to light being reflected from the imaging surface, an image of the pattern is optically captured and the image corresponds to the friction ridges of the finger applying the pressure.

2. The pressure sensitive membrane of claim 1, wherein a refractive index of the elastic deformable film is identical or near identical to that of a light transmitting member including the imaging surface.

3. The pressure sensitive membrane of claim 1, wherein the elastic deformable film comprises a polymer film including one or more of parylene, urethane, polyester, fluorinated ethylene propylene (FEP), ethylene tetrafluoroethylene (ETFE), perfluoroalkoxy (PFA), Polyether ether ketone (PEEK), and/or Kapton.

4. The pressure sensitive membrane of claim 1, wherein the textured surface includes one or more raised standoffs, a sinusoidal wave, a rough textured surface, a microcellular foam, and/or a non-porous layer.

5. The pressure sensitive membrane of claim 1, wherein the textured surface includes a plurality of nanowires.

6. The pressure sensitive membrane of claim 1, wherein the textured surface is cast from a surface of a mold.

7. The pressure sensitive membrane of claim 1, wherein the top surface and/or the bottom surface include one or more coatings, and wherein the elastic deformable film, including the one or more coatings, has less than a 20 µm thickness.

8. The pressure sensitive membrane of claim 7, wherein the one or more coatings are conductive.

9. A total internal reflection based imaging system comprising:
    a light transmitting member having an imaging surface;
    a pressure sensitive membrane arranged on the imaging surface, the pressure sensitive membrane including an elastic deformable film and having a top surface and a bottom surface opposite the top surface, wherein at least a portion of the bottom surface is formed by a textured portion, and wherein the elastic deformable film has less than a 20 µm thickness, and
    wherein the textured portion is formed such that in a default position, an air gap exists between the pressure sensitive membrane and the imaging surface on which the pressure sensitive membrane is arranged, and wherein responsive to a finger applying pressure on the top surface of the pressure sensitive membrane, the pressure sensitive membrane is collapsed into a collapsed position and the air gap is diminished, and wherein a pattern corresponding to friction ridges of the finger is formed by engagement between the pressure sensitive membrane in the collapsed position and the imaging surface responsive to the finger applying pressure on the top surface of the pressure sensitive membrane;
    a light source configured to emit a light towards the imaging surface from a side of the imaging surface opposite the pressure sensitive membrane; and
    an imaging sensor configured to capture light reflected from the imaging surface such that an image of the pattern formed by engagement between the pressure sensitive membrane in the collapsed position and the imaging surface responsive to the finger applying pressure on the top surface of the pressure sensitive membrane is optically captured such that the image corresponds to the friction ridges of the finger applying the pressure.

10. The total internal reflection based imaging system of claim 9, wherein the light transmitting member is a prism or optical waveguide.

11. The total internal reflection based imaging system of claim 9, wherein a refractive index of the elastic deformable film is identical or near identical to that of the light transmitting member.

12. The total internal reflection based imaging system of claim 9, wherein the elastic deformable film comprises a polymer film including one or more of parylene, urethane, polyester, fluorinated ethylene propylene (FEP), ethylene tetrafluoroethylene (ETFE), perfluoroalkoxy (PFA), Polyether ether ketone (PEEK), and/or Kapton.

13. The total internal reflection based imaging system of claim 9, wherein the textured surface includes one or more raised standoffs, a sinusoidal wave, a rough textured surface, a microcellular foam, and/or a non-porous layer.

14. The total internal reflection based imaging system of claim 9, wherein the textured surface includes a plurality of nanowires.

15. The total internal reflection based imaging system of claim 9, wherein the textured surface is cast from a surface of a mold.

16. The total internal reflection based imaging system of claim 9, wherein the top surface and/or the bottom surface include one or more coatings, and wherein the elastic deformable film, including the one or more coatings, has less than a 20 µm thickness.

17. The total internal reflection based imaging system of claim 16, wherein the one or more coatings are conductive.

18. A fluorescent or scattered light imaging system comprising:
   a light transmitting member having an imaging surface;
   a pressure sensitive membrane arranged on the imaging surface, the pressure sensitive membrane including an elastic deformable film and having a top surface and a bottom surface opposite the top surface, wherein at least a portion of the bottom surface is formed by a textured portion, and wherein the elastic deformable film has less than a 20 µm thickness, and
   wherein the textured portion is formed such that in a default position, an air gap exists between the pressure sensitive membrane and the imaging surface on which the pressure sensitive membrane is arranged, wherein responsive to a finger applying pressure on the top surface of the pressure sensitive membrane, the pressure sensitive membrane is collapsed into a collapsed position and the air gap is diminished, and wherein a pattern corresponding to friction ridges of the finger is formed by engagement between the pressure sensitive membrane in the collapsed position and the imaging surface responsive to the finger applying pressure on the top surface of the pressure sensitive membrane;
   a light source configured to emit light from a side of the imaging surface opposite the pressure sensitive membrane such that additional fluorescent or scattered light is propagated into the pressure sensitive membrane at any location on the imaging surface at which the bottom surface of the pressure sensitive membrane contacts the imaging surface due to pressure exerted by the finger on the top surface of the pressure sensitive membrane; and
   an imaging sensor configured to capture the fluorescent or scattered light emission from the imaging surface such that an image of the pattern formed by engagement between the pressure sensitive membrane in the collapsed position and the imaging surface responsive to the finger applying pressure on the top surface of the pressure sensitive membrane is optically captured and the image corresponds to the friction ridges of the finger applying the pressure.

19. The fluorescent or scattered light imaging system of claim 18, wherein the light transmitting member is a prism or optical waveguide.

20. The fluorescent or scattered light imaging system of claim 18, wherein a refractive index of the elastic deformable film is identical or near identical to that of the light transmitting member.

21. The fluorescent or scattered light imaging system of claim 18, wherein the elastic deformable film comprises a polymer film including one or more of parylene, urethane, polyester, fluorinated ethylene propylene (FEP), ethylene tetrafluoroethylene (ETFE), perfluoroalkoxy (PFA), Polyether ether ketone (PEEK), and/or Kapton.

22. The fluorescent or scattered light imaging system of claim 18, wherein the textured surface includes one or more of raised standoffs, a sinusoidal wave, a rough textured surface, a microcellular foam, and/or a non-porous layer.

23. The fluorescent or scattered light imaging system of claim 18, wherein the textured surface includes a plurality of nanowires.

24. The fluorescent or scattered light imaging system of claim 18, wherein the textured surface is cast from a surface of a mold.

25. The fluorescent or scattered light imaging system comprising of claim 18, wherein the top surface and/or the bottom surface include one or more coatings, and wherein the elastic deformable film, including the one or more coatings, has less than a 20 µm thickness.

26. The fluorescent or scattered light imaging system comprising of claim 25, wherein the one or more coatings are conductive.

* * * * *